US011475094B2

(12) United States Patent
 Burzlaff

(10) Patent No.: US 11,475,094 B2
(45) Date of Patent: Oct. 18, 2022

(54) CURATION AND PUBLICATION SYSTEM AND METHOD

(71) Applicant: MiSoon Burzlaff, Berkeley, CA (US)

(72) Inventor: MiSoon Burzlaff, Berkeley, CA (US)

(73) Assignee: Bravo Your Life! Inc., Berkeley, CA (US)

( * ) Notice: Subject to any disclaimer, the term of this patent is extended or adjusted under 35 U.S.C. 154(b) by 0 days.

(21) Appl. No.: 16/319,928

(22) PCT Filed: Mar. 14, 2018

(86) PCT No.: PCT/US2018/022389
§ 371 (c)(1),
(2) Date: Jan. 23, 2019

(87) PCT Pub. No.: WO2018/170100
PCT Pub. Date: Sep. 20, 2018

(65) Prior Publication Data
US 2020/0012703 A1    Jan. 9, 2020

Related U.S. Application Data

(60) Provisional application No. 62/471,187, filed on Mar. 14, 2017.

(51) Int. Cl.
*G06Q 20/10* (2012.01)
*G06F 40/166* (2020.01)
(Continued)

(52) U.S. Cl.
CPC ........ *G06F 16/9577* (2019.01); *G06F 40/166* (2020.01); *G06K 7/10297* (2013.01);
(Continued)

(58) Field of Classification Search
CPC .............. G06F 16/9577; G06F 40/166; G06F 3/04842; G06K 19/0723; G06K 19/06037;
(Continued)

(56) References Cited

U.S. PATENT DOCUMENTS

| 8,738,390 B1 * | 5/2014 | Price | G06F 40/30 |
| | | | 705/1.1 |
| 2008/0172446 A1 * | 7/2008 | Donovan | H04N 21/4828 |
| | | | 709/202 |

(Continued)

*Primary Examiner* — Stephen S Hong
*Assistant Examiner* — Ahamed I Nazar
(74) *Attorney, Agent, or Firm* — J. Steven Svoboda

(57) ABSTRACT

A system includes: a website; a database operably connected to the website; a microguide creation module operably connected to the database, the microguide creation module configured to create a microguide comprising a submission approved for publication, the microguide publishable by the website as a microguide display; and a publication interface operably connected to the microguide creation module, the publication interface comprising a publication readable by a user, the publication comprising a machine readable code, the machine readable code configured to transfer the user from the publication to the microguide display. A method includes: receiving a pending submission; reviewing the pending submission; approving the pending submission for publication; creating a microguide comprising the approved submission; publishing the microguide as a microguide display; and transferring a user, by a publication interface comprising a publication readable by the user, the publication comprising a machine readable code, from the publication to the microguide display.

5 Claims, 17 Drawing Sheets

(51) Int. Cl.
*G06F 3/04842* (2022.01)
*G06F 16/957* (2019.01)
*G06K 19/07* (2006.01)
*G06K 19/06* (2006.01)
*G06K 7/10* (2006.01)
*G06K 7/14* (2006.01)

(52) U.S. Cl.
CPC ..... *G06K 7/1417* (2013.01); *G06K 19/06037* (2013.01); *G06K 19/0723* (2013.01); *G06F 3/04842* (2013.01); *G06Q 20/10* (2013.01)

(58) Field of Classification Search
CPC .. G06K 7/10297; G06K 7/1417; G06Q 20/10; G06Q 20/1235
See application file for complete search history.

(56) References Cited

U.S. PATENT DOCUMENTS

| | | | | |
|---|---|---|---|---|
| 2010/0287163 A1* | 11/2010 | Sridhar | .................. | G06Q 30/02 707/740 |
| 2010/0318888 A1* | 12/2010 | Leshner | ................ | G06F 40/186 715/202 |
| 2011/0202471 A1* | 8/2011 | Scott | .................. | G06Q 30/0278 705/306 |
| 2012/0278721 A1* | 11/2012 | Beidel | .................... | G06Q 50/00 715/733 |
| 2014/0209671 A1* | 7/2014 | Finlow-Bates | ........ | G09B 29/10 235/375 |
| 2015/0066993 A1* | 3/2015 | Donabedian | ............ | H04L 67/22 707/803 |
| 2015/0067512 A1* | 3/2015 | Roswell | .............. | G06F 3/04842 715/716 |
| 2015/0088668 A1* | 3/2015 | Bruce | .................. | G06F 16/972 705/14.73 |
| 2015/0264093 A1* | 9/2015 | Madisch | .............. | G06Q 10/101 715/753 |
| 2015/0302109 A1* | 10/2015 | Oh | ......................... | H04L 67/02 715/202 |
| 2015/0310476 A1* | 10/2015 | Gadwa | ............... | G06Q 30/0226 705/14.27 |
| 2016/0012209 A1* | 1/2016 | Baldwin | .................. | G06F 21/10 726/26 |
| 2016/0037217 A1* | 2/2016 | Harmon | ............. | H04N 21/4542 725/9 |
| 2016/0323434 A1* | 11/2016 | Want | ...................... | H04L 67/18 |
| 2017/0161292 A1* | 6/2017 | Sever | .................... | G06F 40/103 |
| 2017/0206523 A1* | 7/2017 | Goeringer | ............... | G06F 21/45 |
| 2017/0221029 A1* | 8/2017 | Lund | .................... | G06Q 50/184 |

\* cited by examiner

_US 11,475,094 B2_

CURATION AND PUBLICATION SYSTEM AND METHOD

PRIORITY CLAIM

The present application claims the priority benefit of U.S. provisional patent application No. 62/471,187 filed Mar. 14, 2017 and entitled "Systems and Methods for User Generated Content Curation and Publishing," the disclosure of which is incorporated herein by reference.

SUMMARY

A curation and publication system includes: a website; a database operably connected to the website; a microguide creation module operably connected to the database, the microguide creation module configured to create a microguide comprising a submission approved for publication, the microguide publishable by the website as a microguide display; and a publication interface operably connected to the microguide creation module, the publication interface comprising a publication readable by a user, the publication comprising a machine readable code configured to transfer the user from the publication to the microguide display.

A method for curating and publishing includes: receiving a pending submission; reviewing the pending submission; approving the pending submission for publication; creating a microguide comprising the approved submission; publishing, by the website, the microguide as a microguide display; and transferring a user, by a publication interface comprising a publication readable by the user, the publication comprising a machine readable code, from the publication to the microguide display.

A curation and publication system includes: a website; a database operably connected to the website; a user interface operably connected to the website, the user interface configured to receive a pending submission; an editorial module operably connected to the website, the editorial module configured to review the pending submission, the editorial module further configured to approve the pending submission for publication; a microguide creation module operably connected to the database, the microguide creation module configured to create a microguide comprising the approved submission, the microguide publishable by the website as a microguide display, the microguide creation module further configured to transmit the microguide, using the user interface to a user for a second microguide display by a second website of the user; and a publication interface comprising a publication readable by a user, the publication comprising an abridged microguide, the publication further comprising a machine readable code usable to transfer the user from the publication to one or more of the microguide display and a mobile device of the user, an electronic book, a Portable Digital Format document, an inline frame overlay, a mobile phone application, a news platform publication, and another publication, the publication interface operably connected to the microguide creation module, wherein, after the user scans the machine readable code, the system gives the user digital access to an updated, unabridged microguide corresponding to a subject of the abridged print microguide.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

Figure 1:
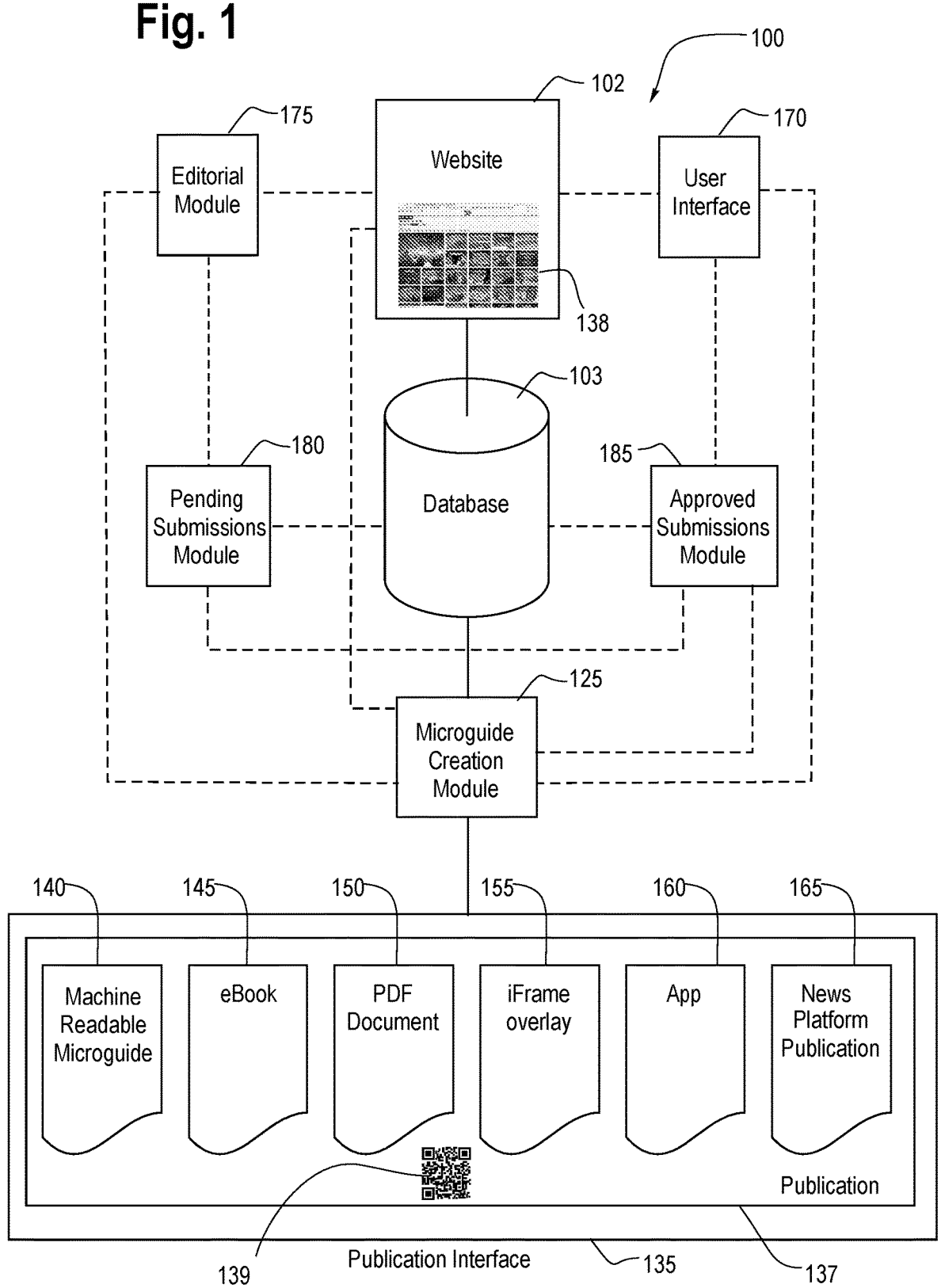
FIG. 1 is a schematic diagram showing components of a curation and publication system.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

FIG. 1 is a schematic diagram showing components of a curation and publication system 100.

The curation and publication system 100 comprises a website 102, a database 103 operably connected to the website 102, a microguide creation module 125 operably connected to the database 103, and a publication interface 135 operably connected to the microguide creation module 125, the publication interface 135 comprising at least one publication 137.

The microguide creation module 125 is configured to create a microguide comprising a submission approved for publication, the microguide publishable by the website 102 as a microguide display 138. The submission portal comprises one or more of a story submission portal, a media submission portal, and another submission portal. For example, the story submission option comprises a story upload portal. For example, the submission comprises one or more of a text submission, a photograph, an audio submission, a video submission, and another submission. For example, the text submission comprises one or more of a story, an article, a poem, a play, a script, and another text submission. Optionally, the microguide creation module 125 is operably connected to the website 102.

The database 103 forwards the approved submission to the microguide creation module 125, which prepares a microguide using the approved submission. The microguide creation module 125 then transmits the microguide to the publication interface 135. The system allows the user to do one or more of customize selected submissions (e.g., stories) and curate the selected submissions into a microguide capable of being downloaded or otherwise transmitted to the publication interface 135.

The microguide creation module 125 is configured to create a microguide comprising a pending submission submitted for publication and approved for publication, the microguide publishable by the website as the microguide display 138.

For example, the microguide creation module 125 displays a microguide on the website 102. For example, the microguide creation module 125 displays a microguide that comprises one or more approved submissions.

Once a submission is approved and published on the system, a user can curate it into the user's own submission collection, using the microguide creation module 125. The user's submission collection, curated using the microguide creation module 125, can comprise one or more of a mini-magazine and a published microguide. The submission collection can comprise one or more of submissions by the user and submissions by other users. Such submission collections can themselves be treated as a single submission and submitted by a user to the editorial module 110 for consideration for publication on the website 102. Alternatively, or additionally, one or more submissions comprised in the submission collection can be published on the website 102 as an individual submission.

The user can limit access to the user's submission collection to certain specified users. Alternatively, or additionally, access to the user's submission collection can be available to any authorized user.

The publication 137 comprises a machine readable code 139. The machine readable code 139 comprises one or more of a quick response (QR) code, a near-field communication (NFC) chip, and another machine readable code. The machine readable code 139 is configured to transfer the user from the publication 137 to the microguide display 138. Alternatively, or additionally, the machine readable code 139 is configured to transfer a reader of a publication 137 to the user's mobile device (not shown). For example, the user's mobile device comprises one or more of a mobile telephone, a tablet, an in-flight entertainment system, a laptop computer, and another mobile device. For example, the transfer comprises one or more of a download, an upload, a wired transfer, and another transfer.

The machine readable code 139, when read by the mobile device, displays to the user an associated full digital microguide. Alternatively, or additionally, the machine readable code 139, when read by the mobile device, displays to the user a platform to which the system publishes. For example, the machine readable microguide 140 comprises a printed machine readable microguide 140. The machine readable microguide 140 further comprises a portion of at least one submission comprised in the microguide creation module 125. Preferably, but not necessarily, the machine readable microguide 140 comprises a portion of each of the submissions comprised in the microguide creation module 125.

The machine readable microguide 140 further comprises a map. For example, the map comprises a printed map. For example, the printed map is on a reverse side of the machine readable microguide 140 from the machine readable code 139. For example, the printed map comprises a submission comprised in the microguide creation module 125. Preferably, but not necessarily, the printed map comprises each of the submissions comprised in the microguide creation module 125. For example, the printed map comprises the submissions as points of interest.

For example, the publication 137 comprises one or more of a machine readable microguide 140, an electronic book 145, a Portable Digital Format (PDF) document 150, an inline frame (iFrame) overlay 155, a mobile phone application ("app") 160, a news platform publication 165, and another publication other than those depicted. For example, the news platform publication 165 comprises an interface with one or more of Flipboard (produced by Flipboard of Palo Alto, Calif.), Apple News (produced by Apple, Inc. of Cupertino, Calif.) and another news platform.

Using the iFrame overlay 155, the publication interface 135 provides lines of code to a user authorized by the creator of the submission collection, permitting the authorized user to embed the curated submission collection on the authorized user's website as a user-curated microguide. Alternatively, or additionally, using the iFrame overlay 155, the publication interface 135 is configured to permit the submission collection to be embedded on any user's website without a requirement of authorization. The system thereby provides functionality to allow a user to export a microguide as an overlay for use by a third party user. For example, the user can export a user-curated microguide. For example, the user can export a user-curated microguide as a customized ebook. For example, using a plugin, the third party user can add the system's microguide to the third party user's website. Thus a digital publishing modality is provided enabling text and images to be embedded in a third party website or system.

For example, the user-curated microguide comprises branding associated with the authorized user.

For example, the microguide display 138 can be anonymized. For example, using the microguide creation module, the third party user can anonymize the microguide display 138. For example, one or more of a style of the website and branding of the website can be removed. For example, using the microguide creation module, the third party user can remove the one or more of a style of the website and branding of the website. Accordingly, the third party user then displays on the third party user's website just the microguide itself without any other content from the website.

For example, the microguide has a content format comprising at least two of text, an image, a video, and another content format. For example, the microguide has a content format comprising at least two of text, an image, a video, and another content format.

For example, the microguide creation module is configured to display simultaneously at least two microguide content formats.

For example, the microguide creation module is further configured to display simultaneously at least two microguide content formats from a single pending submission.

The app 160 optionally comprises a QR code. Alternatively, or additionally, the app comprises an NFC chip reader configured to read the microguide.

The news platform publication 165 is configured to transmit a submission to a news platform for publication. For example, the news platform comprises one or more of Flipboard (produced by Flipboard of Palo Alto, Calif.), Apple News (produced by Apple, Inc. of Cupertino, Calif.) and another news platform.

A user can do one or more of customize selected submissions (e.g., stories) and curate the selected submissions into a microguide that can be transferred (e.g., downloaded) to the user device in a format comprising one or more of a microguide with a QR code, an ebook, a PDF document, an iFrame overlay, a mobile phone application, a digital file, an electronic publication, cloud-based software document, and another microguide format. For example, the cloud-based software document comprises a document using software by MOBI Wireless Management, LLC of Indianapolis, Ind. Alternatively, or additionally, the publication interface 135 transfers the microguide to one or more users designated as microguide recipients by the user who created the microguide. Alternatively, or additionally, the microguide can be transferred to a news platform using the news platform publication 165.

Embodiments of the invention can seamlessly integrate with automated news services. One example is the automated news service operated by Apple, Inc. of Cupertino, Calif. For example, the database 103 connects with the automated news services and publishes submissions from the approved submissions module to the automated news service. For example, the website 102 may have its own channel with the automated news service. For example, the website 102 may create a third-party news channel with the automated news service on behalf of a third-party user. Preferably, although not necessarily, a third-party website associated with the third-party news channel is separate from the website. Preferably, although not necessarily, a third-party news channel is separate from a news channel associated with the website. A user reading news from the automated news service will see branding associated with the automated news service and will not know that the news is generated by the third-party user rather than by the website.

Optionally, the system further comprises a user interface 170 configured to do one or more of receive input from the user and provide output to the user. Optionally, the user interface is operably connected to the microguide creation module 125.

For example, the user interface comprises a graphic user interface (GUI).

For example, the user interface is configured to receive content from a user. For example, the user interface is configured to receive a pending submission from a user. For example, the user interface is configured to create an account for a new user. For example, the user interface is configured to create an account for a new user using one or more of the user's electronic mail (email) address and the user's account with a social network (for example, Facebook of Menlo Park, Calif.). For example, the user interface is configured to receive a login from the user. The user interface is configured to receive the user's password.

For example, following the login of the user, the user interface offers the user an option to select a "create" option. After receiving from the user the user's selection of the "create" option, the user interface offers the user an option to select a "new submission" option for what the user is creating. The user interface receives from the user the user's selection of the "new submission" option.

The user interface then provides the user with one or more submission portals. For example, the submission portal comprises one or more of a story submission portal, a media submission portal, and another submission portal. For example, the story submission option comprises a story upload portal. For example, the media submission portal comprises one or more of a photograph submission portal, a video submission portal, and another media submission portal.

Optionally, the system further comprises an editorial module operably connected to the website 102. Optionally, the editorial module is operably connected to the microguide creation module 125. Optionally, the editorial module is operably connected to the user interface.

The editorial module is configured to do one or more of review a pending submission for publication, and approve the submission for publication.

Alternatively, or additionally, the editorial module can curate the submission into a submission collection. For example, the editorial module can curate the submission into a submission collection, using the microguide creation module 125. The submission collection, curated using the microguide creation module 125, can comprise one or more of a mini-magazine and a published microguide. The curated submission collection can comprise curated submissions by one or more users. Such curated submission collections can themselves be treated as a single curated submission and submitted by a user to the editorial module for consideration for publication on the website 102. Alternatively, or additionally, the editorial module can transmit the curated submission collection to the database 103, from where the website 102 publishes it as an individual curated submission.

For example, the editorial module can receive curation feedback. For example, the editorial module can receive curation feedback from a curating user. For example, the editorial module can curate automatically.

Optionally, the system further comprises a pending submissions module operably connected to the database 103, the pending submissions module configured to receive pending submissions from one or more of the database and the user interface. Optionally, the pending submissions module is operably connected to the editorial module. For example, the database 103 comprises the pending submissions module.

The pending submissions module comprises one or more submissions that are pending review by the editorial module for one or more of curation and publication. For example, the pending submissions module comprises one or more of stories, articles, poems, photographs, audio recordings, video recordings, and other pending submissions. For example, the pending submissions module receives the pending submissions from a creating user. For example, the pending submissions module receives the pending submissions from a submission inventory. For example, the system comprises the submission inventory. For example, the submission inventory is external to the system. For example, the pending submissions module receives the pending submissions from a contributor other than a user.

For example, the editorial module is configured to review the pending submission comprised in the pending submissions module. For example, the editorial module comprises a system editor. For example, the system editor comprises one or more of an automatic system editor and a system editorial bot. For example, the editorial module is configured to do one or more of approve a submission, edit a submission, decline a submission, delete a submission, change an order of content of a submission, and publish the edited submission. For example, the editorial module can change an order of photographs in a photographic submission.

Optionally, the system further comprises an approved submissions module operably connected to the database 103, the approved submissions module configured to do one or more of approve pending submissions for publication and receive approved submissions from the editorial module. The approved submissions module may be further configured to transmit approved submissions to one or more of the database and the user interface.

Optionally, the approved submissions module is operably connected to the microguide creation module 125, and transmits the user input to the microguide creation module 125. The user is thereby allowed to do one or more of customize selected submissions (e.g., stories) and curate the selected submissions into a microguide capable of being downloaded or otherwise transmitted to the publication interface 135.

Upon receiving an approved submission from the approved submissions module, the database 103 stores the approved submission. Alternatively, or additionally, the database 103 displays the approved submission on the website 102. Displayed submissions can be viewed by any authorized user. For example, the user may be one or more of a content creator and a third-party licensee. For example, a third-party licensee can license content. For example, the third-party licensee can do one or more of customize the content and curate the content. For example, the third-party licensee can comprise one or more of a user and a third-party organization.

Optionally, the approved submissions module is operably connected to the user interface. Optionally, the approved submissions module is operably connected to the editorial module. Optionally, the approved submissions module is operably connected to the pending submissions module. Optionally, the approved submissions module is operably connected to the microguide creation module 125. For example, the database 103 comprises the approved submissions module. For example, the pending submissions module and the approved submissions module can be combined into one module.

For example, the approved submissions module comprises one or more submissions that have been approved by the system 100, following a review by the system 100, for one or more of curation and publication. For example, the approved submissions module comprises one or more of stories, articles, poems, photographs, audio recordings, video recordings, and other approved submissions.

The approved submissions module is configured to receive user input from the user interface. Alternatively, or additionally, the user interface transmits user input to the website 102, the website forwards the user input to the database 103, which optionally saved the user input, and the database 103 then forwards the user input to the approved submissions module.

Alternatively, or additionally, the editorial module is operably connected to the approved submissions module and can transmit to the approved submissions module a submission that is approved for publication. The submission that is approved for publication can comprise one or more of a curated individual submission, a non-curated individual submission, and a collection of submissions. For example, the collection of submission comprises one or more of curated submissions and non-curated submissions.

Figure 2:
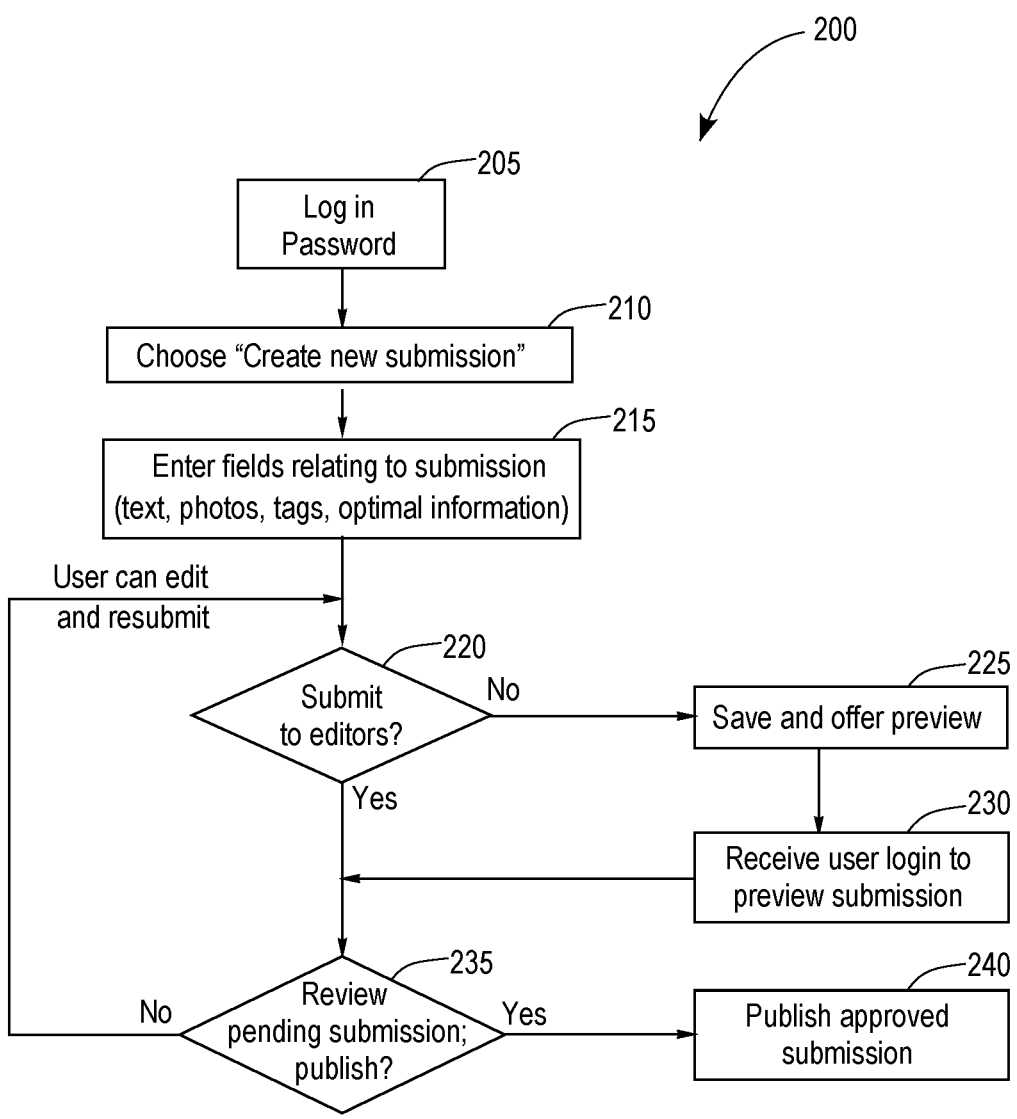
FIG. 2 is a flow chart of a method for curating and publishing user-generated content.

FIG. 2 is a flow chart of a method 200 for curating and publishing.

In step 205, a user interface creates an account for a new user. For example, the user interface creates an account for a new user using one or more of the user's email address and the user's account with a social network (for example, Facebook of Menlo Park, Calif.). The user interface receives a login from the user. The user interface receives a password from the user. Block 205 then transfers control to block 210.

In step 210, following the login of the user, the user interface offers the user an option to select a "create" option. After receiving from the user the user's selection of the "create" option, the user interface offers the user an option to select a "new submission" option for what the user is creating. For example, after receiving from the user the user's selection of the "create" option, the user interface offers the user a dropdown menu that includes an option to select a "new submission" option for what the user is creating. The user interface receives from the user the user's selection of the "new submission" option. For example, the new submission comprises a new story. Block 210 then transfers control to block 215.

In step 215, the user enters fields relating to the user's submission. For example, the user interface displays one or more pre-populated fields, for example, a "write text" field, an upload button, a submission category tag, a submission location, and another pre-populated field. For example, the submission category tag comprises an option to receive the user's designation of a new category. For example, the user submits the submission location using one or more of a drop-down box, a map integration application programming interface (API), and another location submission method. For example, the upload button comprises one or more of an audio upload button, a video upload button, a photograph upload button, and another upload button. Optionally, but not necessarily, the user interface requires the user to upload at least one item. Optionally, but not necessarily, the user interface offers the user the opportunity to enter additional optional information including, for example, cell phone number, business phone number, street address, email address, submission website, and other optional information.

The user interface then receives the user's input into one or more fields relating to the user's submission. Block 215 then transfers control to block 220.

In step 220, the user interface displays to the user a question asking the user if the submission is ready to be sent to the editorial module. If the user answers no, block 220 transfers control to block 225.

In step 225, the user interface offers the user the opportunity to do one or more of save the submission and preview the submission. The system then receives the user's decisions regarding the one or more of saving the submission and previewing the submission. For example, the user saves the submission in the pending submissions module. For example, the user previews the submission using the user interface. The user interface then permits the user to log in later to preview the submission. Block 225 then transfers control to block 230.

In step 230, the content module receives the user's optional log in later to preview the submission. Block 230 then transfers control to block 235.

In step 235, the editorial module reviews the pending submission. For example, the editorial module does one or more of approve a submission for publication, edit a submission, decline a submission for publication, delete a submission, and change an order of content of a submission. For example, the editorial module displays a declined submission to the user in the user profile. For example, the editorial module displays editorial comments for a declined submission. For example, the editorial module displays editorial comments for an approved submission. For example, a declined submission can be deleted on grounds of public nuisance. Alternatively, or additionally, the editorial module curates the approved submission into a submission collection.

If the editorial module decides to publish the submission, block 235 transfers control to block 240. If the editorial module decides not to publish the submission, block 235 transfers control to block 220. The editorial module offers the user the opportunity to do one or more of edit the submission and resubmit the submission to the editorial module.

In step 240, the editorial module sends the approved submission to one or more of the website and the database, which published the approved submission. Block 240 then terminates the process.

Figure 3:
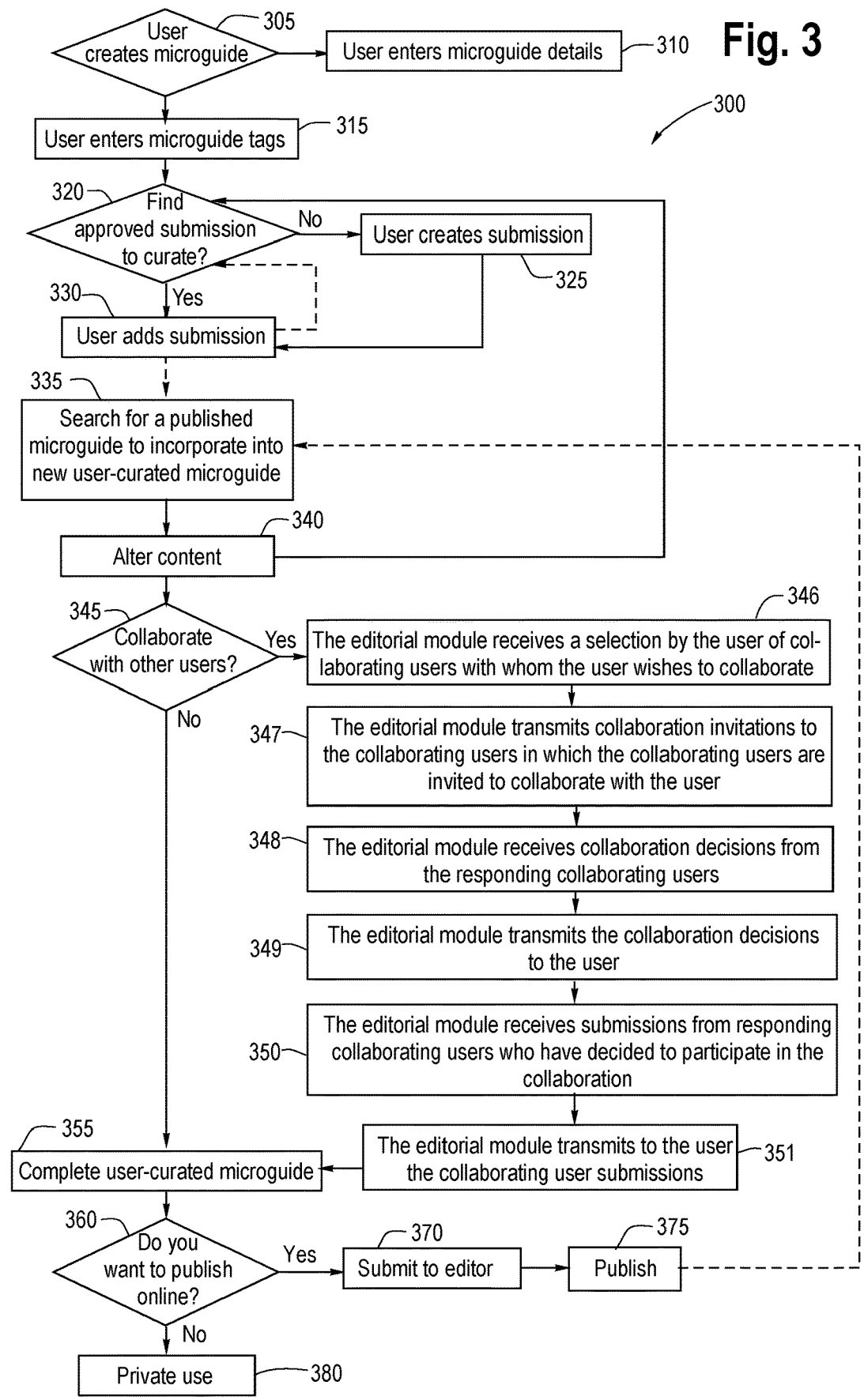
FIG. 3 is a flow chart of a method for curating and publishing user-generated content.

FIG. 3 is a flow chart of a method 300 for curating and publishing. More particularly, FIG. 3 presents a representative user flow for creating a microguide.

In step 305, after logging into the website via the user interface, a user creates a microguide. For example, the user names the microguide when the user first creates the microguide. If desired, the user can subsequently edit the microguide's name. Block 305 then transfers control to block 310.

In step 310, the user enters details regarding the microguide. For example, the user specifies one or more of a microguide category, a microguide purpose, a microguide format, one or more publication interfaces to be used with the microguide, and another microguide detail. Block 310 then transfers control to block 315.

In step 315, the user enters one or more microguide category tags describing the microguide. Block 315 then transfers control to block 320.

In step 320, the user interface asks the user if the user can find an approved submission to curate. For example, the database allows the user to search for a approved submission using the website. If no, block 320 transfers control to block 325. If yes, block 320 transfers control to block 330.

In step 325, the user interface invites the user to create a new submission. The system can curate the new submission into a microguide following editorial approval by the editorial module. If the user interface receives a new submission from the user, the user interface transmits the new submission to the pending submissions module. Block 325 then transfers control to block 330.

In step 330, the pending submissions module receives from the user a pending submission. For example, the pending submission comprises a pending story. For example, the pending submission comprises one or more of a submission created by the user and a submission created by another user. Optionally, block 330 transfers control back to block 320 so that the user can search for another submission. Alternatively, or additionally, block 330 transfers control to block 335.

In step 335, the microguide creation module offers the user the opportunity to select an existing microguide for incorporation by the pending submissions module into a new user-curated microguide. For example, the user may change the title of the existing microguide, creating a new title for the user-curated microguide that will be saved by the pending submissions module. Block 335 then transfers control to block 340.

In step 340, the pending submissions module allows one or more of the user and the editorial module to alter content of the user-curated microguide. For example, one or more of the user and the editorial module performs one or more of adding a new submission to the user-curated microguide and deleting an existing submission from the user-curated microguide. Block 340 then transfers control to block 345.

In step 345, the editorial module asks the user if they want to collaborate with another user in the user's work on the user's user-curated microguide. For example, a user who is an author collaborates with another user who is a photographer. If yes, block 345 transfers control to block 346. If no, block 345 transfers control to block 355.

In step 346, the user selects the other collaborating users with whom the user wishes to collaborate. The editorial module receives the user's selection of collaborating users. Block 346 then transfers control to block 347.

In step 347, the editorial module transmits collaboration invitations to the collaborating users in which the collaborating users are invited to collaborate with the user. Block 347 then transfers control to block 348.

In block 348, the editorial module receives collaboration decisions from responding collaborating users. Block 348 then transfers control to block 349.

In block 349, the editorial module transmits the collaboration decisions to the user. Block 349 then transfers control to block 350.

In block 350, the editorial module receives submissions from responding collaborating users who have decided to participate in the collaboration. Block 350 then transfers control to block 351.

In block 351, the editorial module transmits to the user the collaborating user submissions. Block 351 then transfers control to block 355.

In block 355, the editorial module creates the user-curated microguide, using the collaborating user submissions if any. In creating the user-curated microguide, the system editor can also use claimable stories created by other users and made available for use. Optionally, the user can use the editorial module to close the user-curated microguide from changes to the curated submissions comprised in the user-curated microguide. If the user selects this option, the result is a curated, closed microguide comprising submissions from other content creators, the curated microguide not being editable by others. Block 355 then transfers control to block 360.

In step 360, the pending submissions module asks the user if he wants to publish the user-curated microguide. If yes, block 360 then transfers control to block 370. If no, block 360 then transfers control to block 380.

In step 370, the pending submissions module transmits the user-curated microguide to the editorial module. Alternatively, or additionally, the editorial module receives from the user a submission of the user-curated microguide. Block 370 then transfers control to block 375.

In step 375, the user-curated microguide is published on the website, using the database. Optionally, the process returns to step 335 and a search for another published microguide starts. Alternatively, block 375 then terminates the process.

In step 380, the editorial module offers the user the opportunity to limit the user-curated microguide to one or more of personal use and private use. The user-curated microguide is not published on the system. Block 380 then terminates the process.

Figure 4:
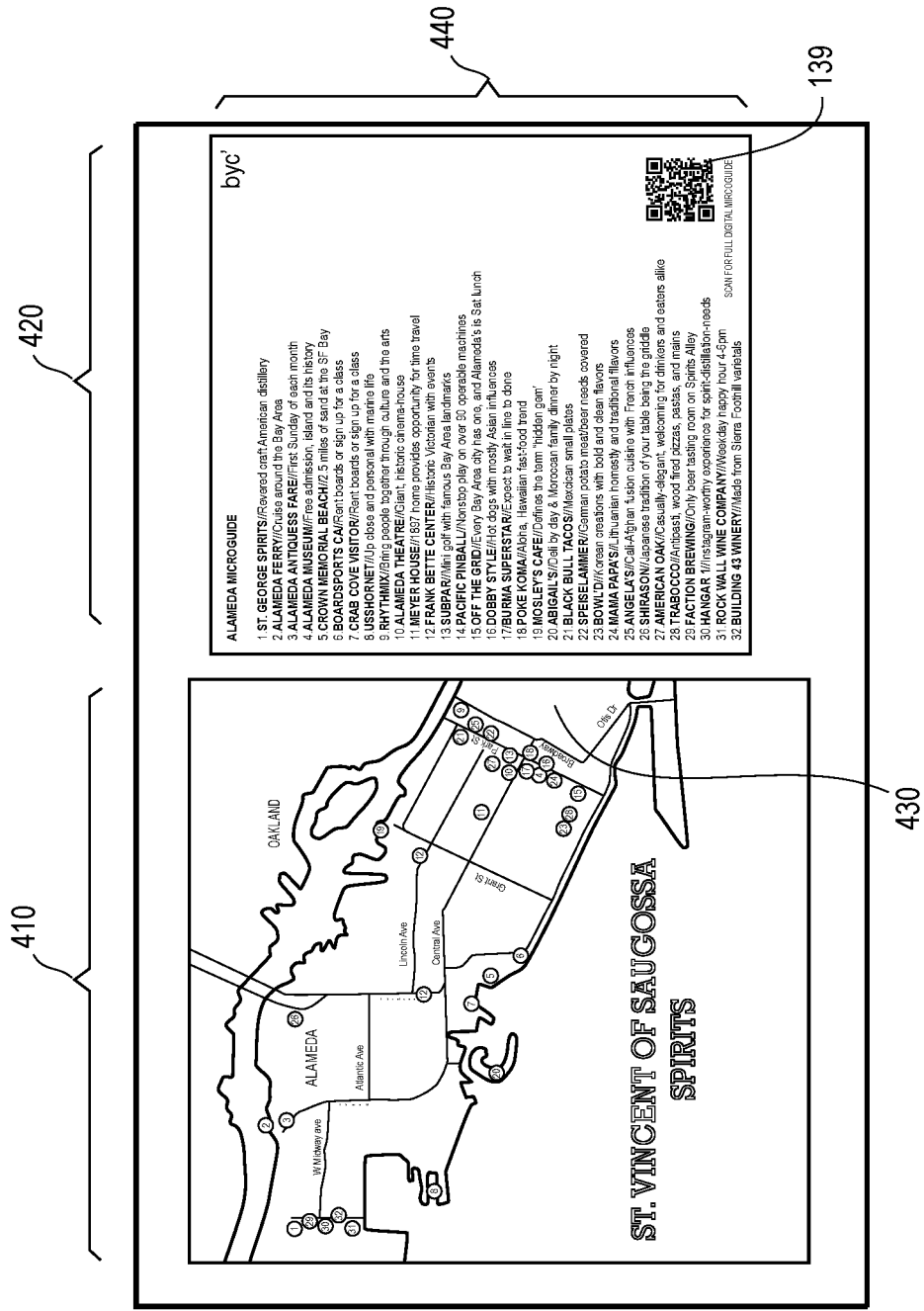
FIG. 4 is a drawing of a microguide created by a curation and publication system.

FIG. 4 is a drawing of a print microguide 400 created by a curation and publication system.

The exemplary print microguide 400 comprises an abridged print microguide of the city of Alameda, Calif. The print microguide 400 may be produced as a print product on one or more of paper and cardboard. A facsimile of the print microguide 400 may also be displayed on the website. For example, one or more of a system designer and an automated design agent makes the print microguide 400.

Preferably, although not necessarily, the print microguide 400 comprises a first print microguide side 410 and a second print microguide side 420. Included in the print microguide 400 are a street map 430 of the city of Alameda, Calif., a text microguide 440 to the city of Alameda, Calif., and a machine readable code 139. Preferably, although not necessarily, and as depicted, the street map 430 appears on the first print microguide side 410. Preferably, although not necessarily, the text microguide 440 and the machine readable code 139 appear on a second side of the print microguide 400. The machine readable code 139 comprises one or more of a quick response (QR) code, a near-field communication (NFC) chip, and another machine readable code.

As depicted, the machine readable code 139 comprises a QR code 139. As depicted, the street map 430 comprises a one-page map of Alameda. As depicted, the 440 comprises locations of points of interest.

The print microguide 400 is configured to be usable as a print-to-digital product that allows the user, by scanning the QR code 139 using a mobile device, to obtain digital access to an updated, unabridged digital microguide corresponding to a subject of the print microguide 400. For example, the user's mobile device comprises one or more of a mobile telephone, a tablet, a laptop computer, and another mobile device. In this case, the updated, unabridged digital microguide accessible using the QR code 139 comprises a microguide to the city of Alameda, Calif. Scanning the QR code 139 transfers the user to one or more of the website and a third-party website. For example, the third-party website comprises the third-party website of one or more of the creator of the print microguide 400 and a licensee of the creator of the print microguide 400. In this example, the third-party website to which scanning the QR code 139 transfers the user is the third-party website of St. Vincent of Saragossa Spirits, the licensee of the creator of the print microguide 400.

Figure 5:
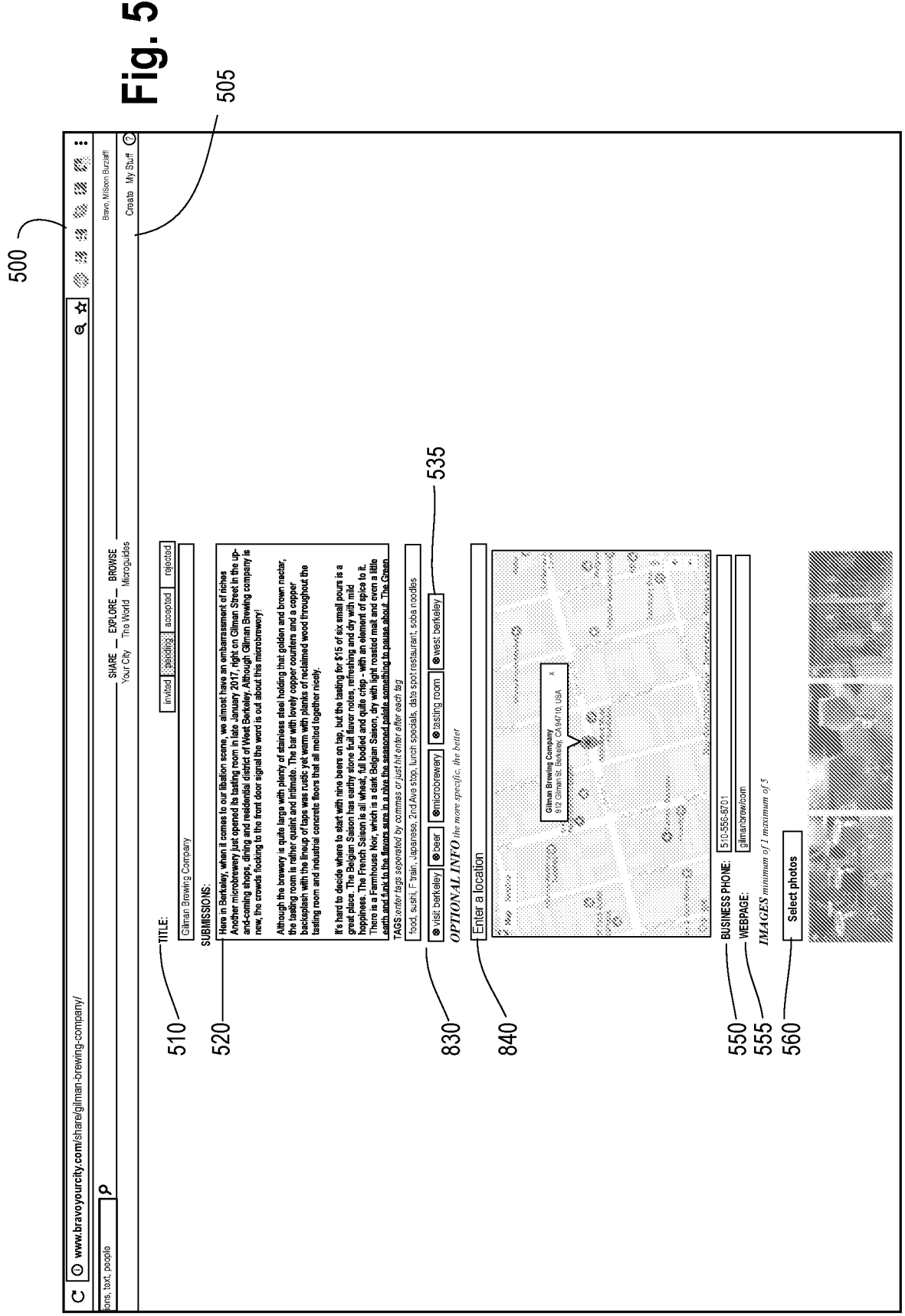
FIG. 5 is an exemplary screenshot of a curation and publication system.

FIG. 5 is an exemplary screenshot 500 of a curation and publication system. More specifically, FIG. 5 is an exemplary screenshot 500 of a content creator's submission page for a curation and publication system.

The screenshot 500 comprises a "create" button 505. When clicked by a user, the "create" button 505 brings the user to a page allowing the user to create a pending submission, for example, a pending story submission.

The screenshot 500 further comprises a submission title window 510. Using the submission title window 510, the user inputs a title for the submission. In this case, as depicted, the user submits to the system a title, "Gilman Brewing Company."

The screenshot 500 further comprises a submission composition window 520. Using the submission composition window 520, the user writes the submission. In this case, as depicted, the submission comprises an introduction of a reader to the Gilman Brewing Company.

The screenshot 500 further comprises a tags window 530. Using the tags window 530, the user selects one or more category tags for the submission. As depicted, the category tags selected by the user comprise "food," "sushi," "F train," "Japanese," $2^{nd}$ Ave. stop," "lunch specials," "date spot," "restaurant," and "soba noodles." As depicted, the tags window 530 comprises a legend, "TAGS: Enter tags separated by commas or just hit enter after each tag." The screenshot 500 further comprises existing tags 535. Alternatively, or additionally, the user reviews and edits the existing tags 535 that were previously selected. As depicted, the existing tags 535 comprise "visit Berkeley," "beer," "microbrewery," "tasting room," and "visit Berkeley."

The screenshot 500 further comprises a submission location window 540. For example, the user submits the submission location using one or more of a drop-down box, a map integration application programming interface (API), and another location submission method. As depicted, the user selects the submission location using the map integration API, which picks out Gilman Brewing Company, 912 Gilman Street, Berkeley, Calif.

The screenshot 500 further comprises a business phone window 550. Using the business phone window 550, one or more of the editorial module and the user submits the relevant business phone number. For example, the editorial module can review the business phone using an API. For example, the editorial module can do one or more of automatically populate the business phone using an API, automatically review the business phone using the API.

The screenshot 500 further comprises a business webpage window 555. Using the business webpage window 555, the user submits the relevant webpage.

The screenshot 500 further comprises an image submission button 560. Using the image submission button 560, the user can select one or more images to transfer. For example, the user can select one or more images to upload. Often, although not as depicted in this particular example, the screenshot will further include one or more of an audio submission button suitable for submitting audio files, a video submission button suitable for submitting video files, and another submission button.

Figure 6:
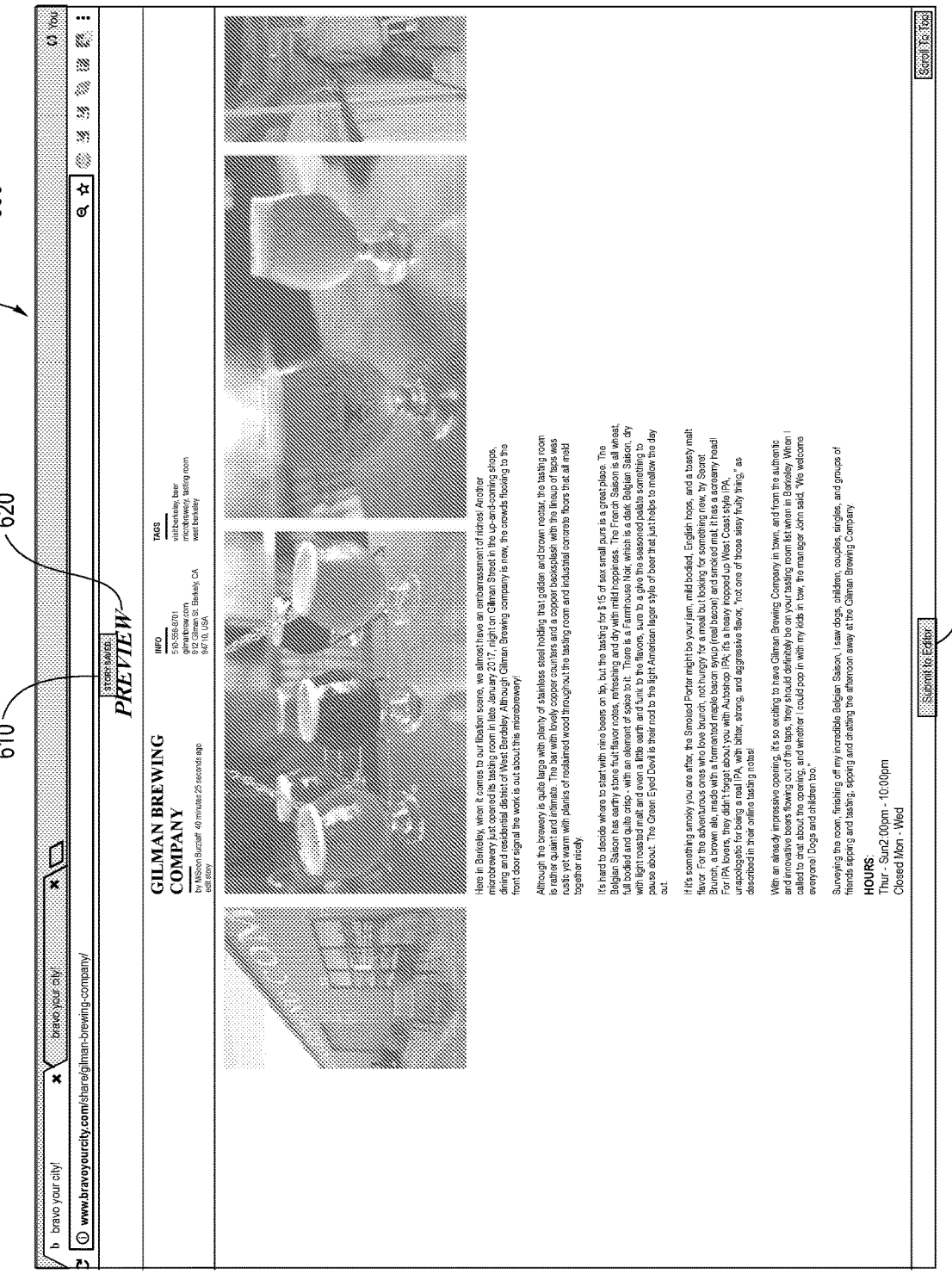
FIG. 6 is an exemplary screenshot of a curation and publication system.

FIG. 6 is an exemplary screenshot 600 of a curation and publication system. More specifically, FIG. 6 is an exemplary screenshot 600 of a content creator's submission save and preview page for a curation and publication system.

The screenshot 600 shows what the user will see and what the system will display after the user saves a submission. The screenshot 600 comprises a banner 610 showing that the user has recently successfully saved a submission.

The screenshot 600 further comprises a "preview" banner 620. After the user has saved the submission, the user can preview the submission to see what it will look like on the website if successfully published. The screenshot further comprises, below the "preview" banner 620, the preview 630 of the submission that is available for review by the user. Depicted is a preview 630 of the same submission that the user prepared in FIG. 5.

The screenshot 600 further comprises a "submit to editor" button 640 that the user can click once the user has reviewed the preview 630 and is satisfied that the submission is ready to be submitted to the editor. Following the user's submission, the user interface sends the submission to the pending submissions module.

Figure 7:
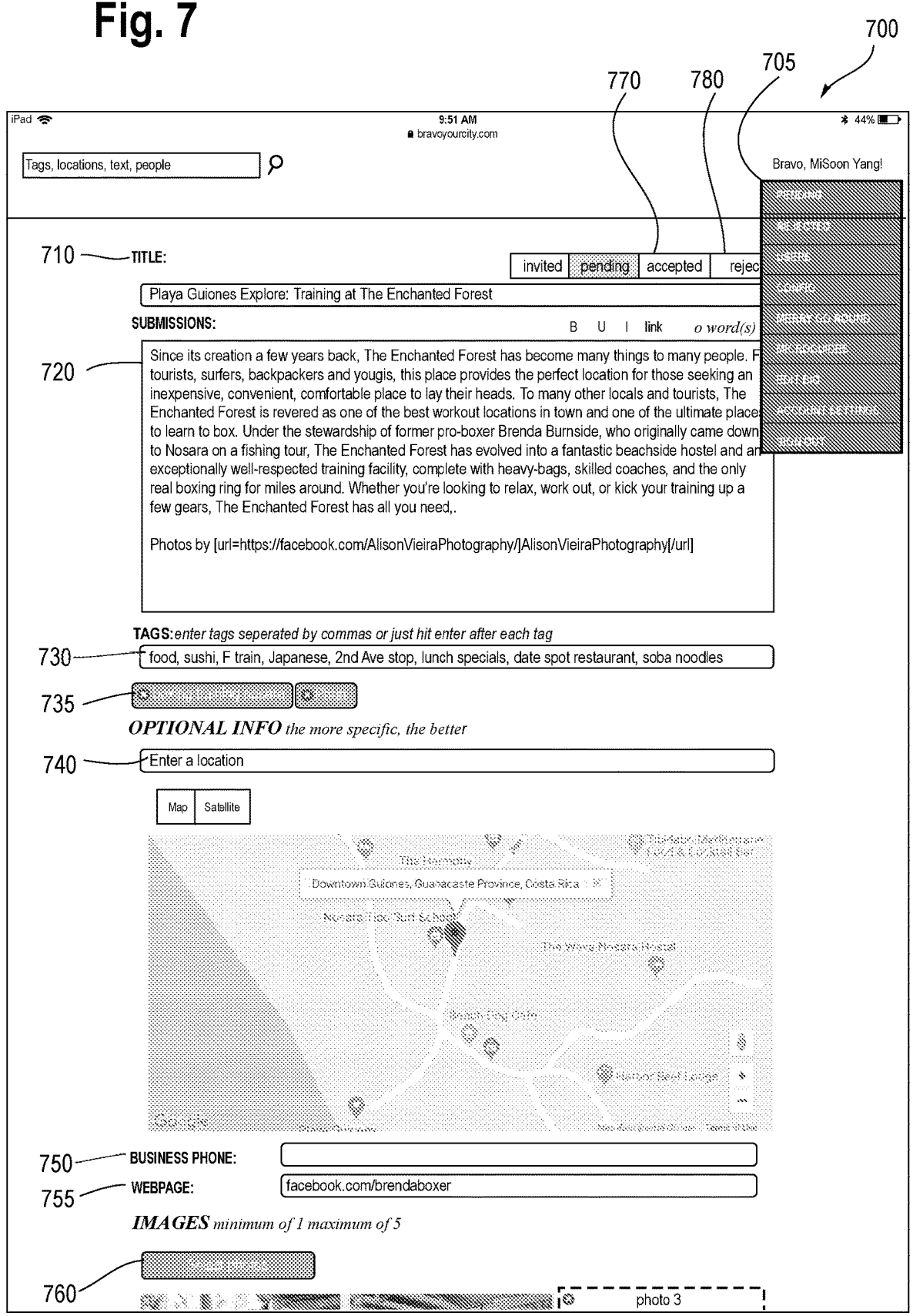
FIG. 7 is an exemplary screenshot of a curation and publication system.

FIG. 7 is an exemplary screenshot 700 of a curation and publication system. More specifically, FIG. 7 is an exemplary screenshot 700 of an administrator's or human editor's page to approve and publish a submission for a curation and publication system. The exemplary screenshot 700 shows pending submissions as they will appear if approved and published.

The screenshot 700 comprises a submission status button 705. When a human editor hovers a mouse or similar device, the status button 705 informs the editor of a status of the submission. As depicted, the status button 705 informs the editor that the status of the submission is pending.

The screenshot 700 further comprises a submission title window 710. The editor can change the title shown in the submission title window 710, and the editorial module can also change the title.

Using the submission title window 710, the user inputs a title for the submission.

The screenshot 700 further comprises a submission composition window 720. Using the submission composition window 720, the editor can review the submission for one or more of writing quality, correctness of facts, avoidance of plagiarism, avoidance of copyright infringement, grammar, spelling, and another submission review criterion. Similarly, the editorial module can review the submission for one or more of writing quality, correctness of facts, avoidance of plagiarism, avoidance of copyright infringement, grammar, spelling, and another submission review criterion. For example, the editorial module can review the submission using an API. For example, the editorial module can automatically review the submission using the API. One or more of the editor and the editorial module can edit the submission directly. The editor can use the submission composition window 720 to do the submission editing.

The screenshot 700 further comprises a tags window 730. Using the tags window 730, one or more of the editorial module and the editor can select one or more category tags for the submission. As depicted, the category tags selected by the editor comprise "food," "sushi," "F train," "Japanese," $2^{nd}$ Ave. stop," "lunch specials," "date spot," "restaurant," and "soba noodles." As depicted, the tags window 730 comprises a legend, "TAGS: Enter tags separated by commas or just hit enter after each tag." One or more of the editorial module and the editor can review the category tags. Similarly, the editorial module can review the category tags. One or more of the editor and the editorial module can edit the category tags directly. The editor can use the tags window 730 to do the tags editing.

The screenshot 700 further comprises existing tags 735. Alternatively, or additionally, one or more of the editorial module and the editor reviews and edits the existing tags 735 that were previously selected. For example, the editorial module can review the existing tags 735. For example, the editorial module can do one or more of automatically populate the existing tags 735 using an API., and automatically review the existing tags 735 using the API. As depicted, the existing tags 735 comprise "boxing training nosara and "PHUN."

The screenshot 700 further comprises a submission location window 740. Using the submission location window 740, the editor can review the submission location. Similarly, the editorial module can review the submission location. One or more of the editor and the editorial module can edit the submission location directly. For example, the editorial module can review the submission location. For example, the editorial module can do one or more of automatically populate the submission location using an API, and automatically review the submission location using an API. The editor can use the submission location window 740 to do the submission location editing.

The screenshot 700 further comprises a business phone window 750. Using the business phone window 750, the editor can review the business phone. Similarly, the editorial module can review the business phone. One or more of the editor and the editorial module can edit the business phone directly. For example, the editorial module can review the business phone using an API. For example, the editorial module can do one or more of automatically populate the business phone using an API, automatically review the business phone using the API. The editor can use the business phone window 750 to do the editing of the business phone.

The screenshot 700 further comprises a business webpage window 755. Using the business webpage window 755, the editor can review the business webpage. Similarly, the editorial module can review the business webpage. One or more of the editor and the editorial module can edit the business webpage directly. The editor can use the business webpage window 755 to do the editing of the business webpage.

The screenshot 700 further comprises an image button 760. Using the image button 760, the editor can review the selected images. Similarly, the editorial module can review the selected images. One or more of the editor and the editorial module can do one or more of remove images, add images, and change an order of images. Often, although not as depicted in this particular example, the screenshot will further include one or more of an audio button suitable for reviewing audio files, a video button suitable for reviewing video files, and another submission button suitable for reviewing another type of submission.

The screenshot 700 further comprises a submission acceptance button 770 and a submission rejection button 780. Using the submission acceptance button 770, one or more of the editor and the editorial module can accept the submission as is, or accept the submission once edits have been accepted and been published to the website. Alternatively, or additionally, using the submission rejection button 780, one or more of the editor and the editorial module can reject the submission. Optionally, one or more of the editor and the editorial module can provide comments to the content creator. Optionally, the system gives the content creator an option to do one or more of edit the submission and resubmit the submission to the pending submissions module.

Figure 8:
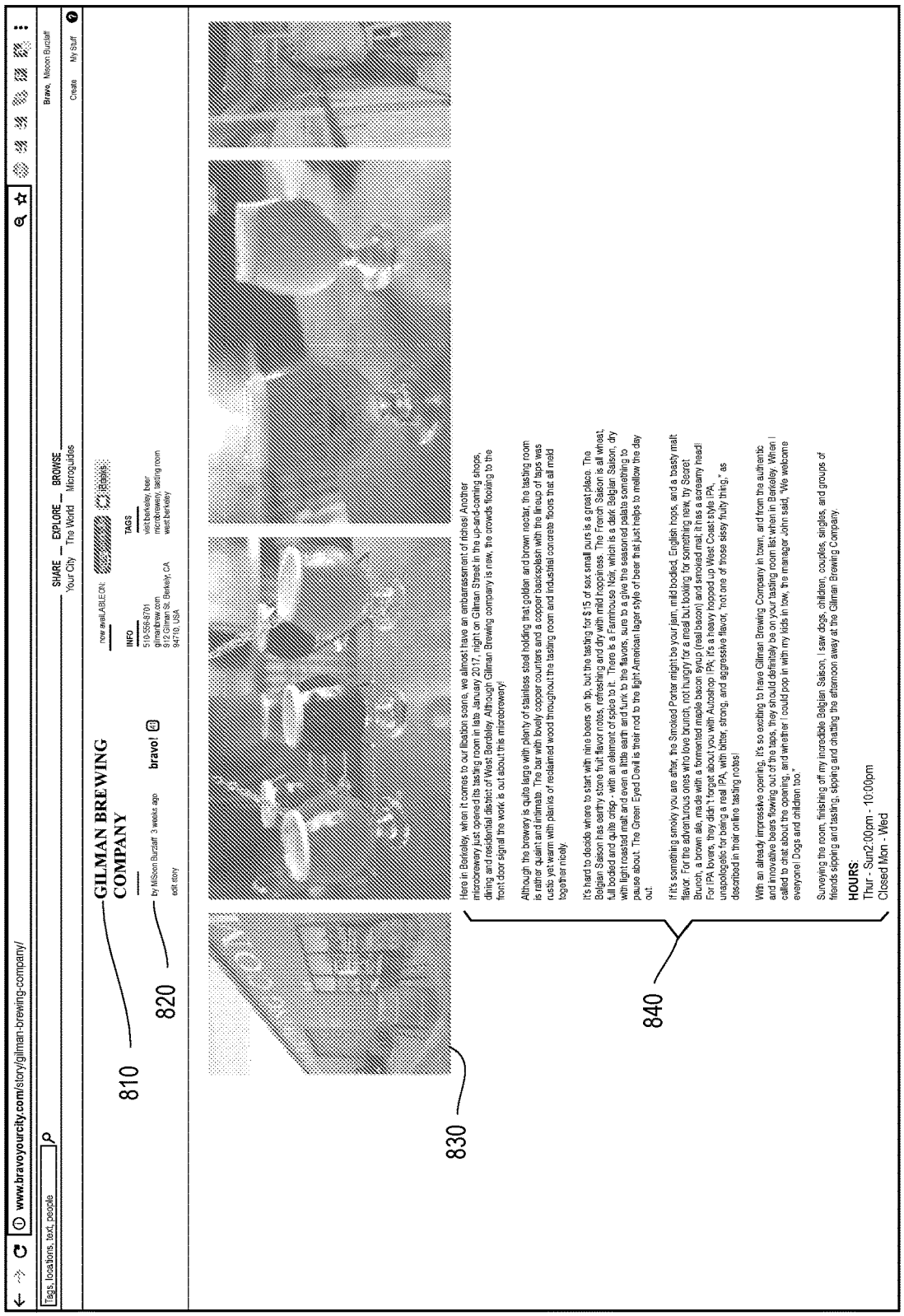
FIG. 8 is an exemplary screenshot of a curation and publication system.

FIG. 8 is an exemplary screenshot 800 of a curation and publication system. More specifically, FIG. 8 is an exemplary screenshot 800 of a user-generated submission as published on the website.

The screenshot 800 comprises a submission title 810. In this example, the submission title is, "Gilman Brewing Company."

The screenshot 800 further comprises a byline 820. The byline 820 gives the gives a name of one or more authors of the submission. The byline optionally includes a link to a biographic page relating to the content creator. The biographic page optionally displays a biography of the content provider. Optionally, one or more of a microguide and a submission is displayed on the biographic page.

The screenshot 800 further comprises images 830. The images 830 were submitted to the system by the content creator, approved by the system, and displayed on the website.

The screenshot 800 further comprises the published submission 840. As depicted, the published submission 840 comprises a published story 840.

Figure 9:
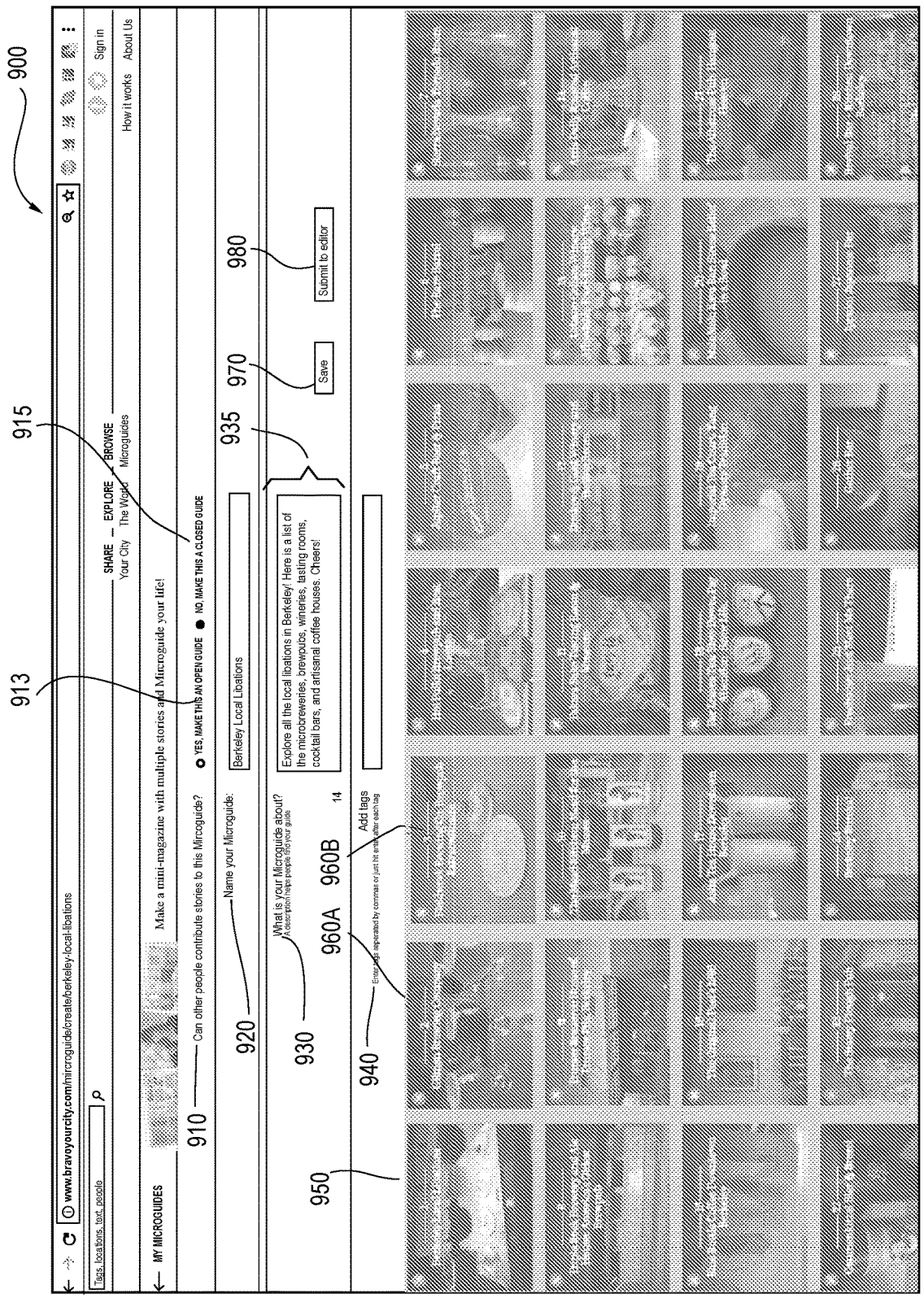
FIG. 9 is an exemplary screenshot of a curation and publication system.

FIG. 9 is an exemplary screenshot 900 of a curation and publication system. More specifically, FIG. 9 is an exemplary screenshot 900 of a user-curated microguide preparation page usable prior to submission of the user-curated microguide to one or more of a human editor and the editorial module.

A content curator is a registered user that curates one or more published submissions on the website into a microguide. A user-curated microguide can be either open, in which other users are allowed to participate in the curation, or closed, meaning that the curator is the only person who can add or delete stories to the user-curated microguide.

The screenshot 900 comprises an open microguide/closed microguide window 910. As depicted, the open microguide/closed microguide window 910 comprises two clickable options, a "Yes, make this an open guide" button 913, and a "No, make this a closed guide" button 915. Using the open microguide/closed microguide window 910, by selecting one of the "Yes, make this an open guide" button 913 and the "No, make this a closed guide" button 915, the curator determines whether the user-curated microguide is open to other people's contribution of submissions or is closed to other people's contribution of submissions.

The screenshot 900 further comprises a microguide title button 920. As depicted, the microguide title button 920 comprises a legend, "Name your Microguide." As depicted, the curator has chosen a title, "Berkeley Local Libations."

The screenshot 900 further comprises a microguide description legend 930. As depicted, the microguide description legend 930 comprises the text, "What is your Microguide About? A description helps people find your guide." The screenshot further comprises a microguide description composition window 935. Using the microguide description composition window 935, the curator can write a short description of the user-curated microguide. As depicted, the curator has written the following microguide description: "Explore all the local libations in Berkeley! Here is a list of the microbreweries, brewpubs, wineries, tasting rooms, cocktail bars, and artisanal coffee houses. Cheers!" The system submits the microguide description to the editorial module. If the editorial module accepts the microguide description, the system displays the microguide description under the user-curated microguide title when the user-curated microguide is published on the system.

The screenshot 900 further comprises a tags window 940. As depicted, the tags window 940 comprises a legend, "Add tags. Enter tags, separated by commas or just hit enter after each tag." Using the tags window 940, the curator selects one or more microguide category tags describing the user-curated microguide. Alternatively, or additionally, the curator reviews and edits microguide category tags that were previously selected.

The screenshot 900 further comprises a new submission 950. The curator adds a new submission 950 from the website to the microguide. As depicted, the new submission 950 comprises a submission titled, "Berkeley Local Libations." For example, the curator adds the new submission 950 from the website to the microguide by dragging and dropping the selected new submission 950.

The screenshot 900 further comprises two existing submissions 960A and 960B. The curator can change an order of existing submissions 960A and 960B. For example, the curator can change an order of existing submissions 960A and 960B by dragging and dropping an existing submission 960A to a new location. The curator can also decide to delete an existing submission 960A or 960B. The curator can also decide to delete a new submission 950.

The screenshot 900 further comprises a save button 970. The curator can click the save button 970 and thereby cause the system to save the user-curated microguide in draft form in the curator's user account.

The screenshot 900 further comprises a "submit to editor" button 980. The curator can click the "submit to editor" button 980, causing the system to submit the user-curated microguide to one or more of the human editor and the pending submissions module.

Figure 10:
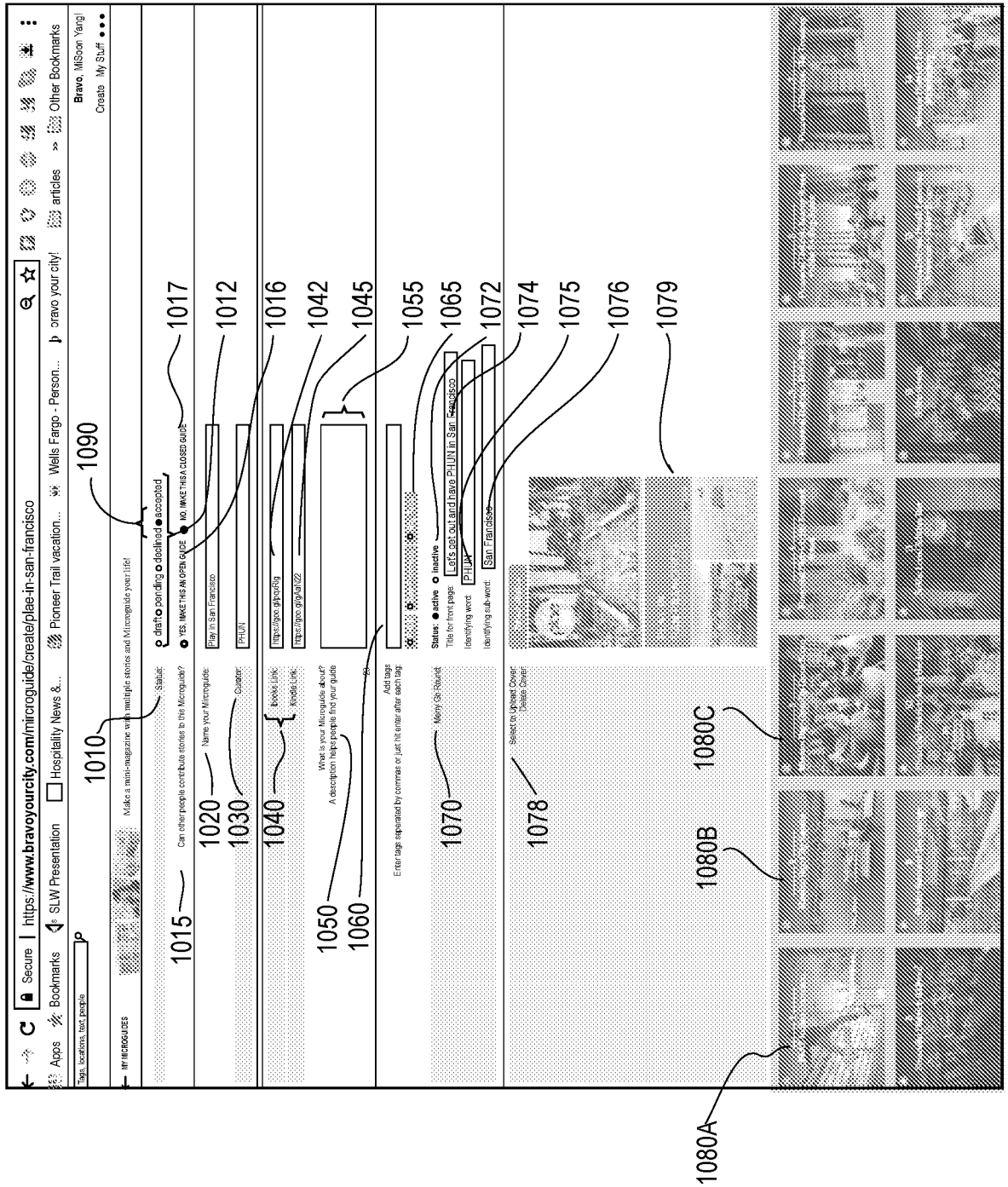
FIG. 10 is an exemplary screenshot of a curation and publication system.

FIG. 10 is an exemplary screenshot 1000 of a curation and publication system. More specifically, FIG. 10 is an exemplary screenshot 1000 of a user-curated microguide preparation page usable by one or more of the editorial module and a human editor to do one or more of approve and publish the user-curated microguide.

The screenshot 1000 comprises a microguide status window 1010. The microguide status window 1010 displays a status of the user-curated microguide that is currently under review. The status window 1010 offers status window options 1012 that will be selected later in the process by one or more of the editorial module and the human editor as described below. As depicted, the status window options 1012 offered by the status window 1010 comprise draft, pending, declined, and accepted.

The screenshot 1000 further comprises an open microguide/closed microguide window 1015. As depicted, the open microguide/closed microguide window 1015 comprises two clickable options, a "Yes, make this an open guide" button 1016, and a "No, make this a closed guide" button 1017. Using the open microguide/closed guide window 1015, by selecting one of the "Yes, make this an open guide" button 1016 and the "No, make this a closed guide" button 1017, the editor determines whether the user-curated microguide is open to other people's contribution of submissions or is closed to other people's contribution of submissions.

The screenshot 1000 further comprises a microguide title button 1020. As depicted, the microguide title button 1020 comprises a legend, "Name your Microguide." As depicted, the editor has chosen a microguide title, "Play in San Francisco." One or more of the editor and the editorial module can change the microguide title.

The screenshot 1000 further comprises a microguide curator button 1030. As depicted, the microguide curator button 1030 comprises a legend, "Curator." As depicted, the selected curator is the organization PHUN. One or more of the editor and the editorial module can change the curator.

The screenshot 1000 further comprises a microguide external links button 1040. As depicted, the microguide external links button 1040 comprises legends, "$1^{st}$ link" and "$2^{nd}$ link." As depicted, the microguide external links button 1040 further comprises a first microguide external link 1042 and a second microguide external link 1045. The first microguide external link 1042 comprises a URL configured to take a user to one or more of a first external website relating to the user-curated microguide and a first publishing platform relating to the user-curated microguide. The second microguide external link 1045 comprises a URL configured to take a user to one or more of a second external website relating to the user-curated microguide and a second publishing platform relating to the user-curated microguide.

The screenshot 1000 further comprises a microguide description legend 1050. As depicted, the microguide description legend 1050 comprises the text, "What is your Microguide About? A description helps people find your guide." The screenshot further comprises a microguide description composition window 1055. Using the microguide description composition window 1055, the editor can edit the short description of the user-curated microguide. As depicted, the editor has written the following microguide description: "Let's get out and have 'HUN' in San Francisco! Explore some of our favorite gems in the city." One or more of the editor and the editorial module can edit the microguide description.

The screenshot 1000 further comprises a tags window 1060. As depicted, the tags window 1060 comprises a legend, "Add tags. Enter tags separated by commas or just hit enter after each tag." Using the tags window 1060, the editor optionally enters one or more further microguide category tags describing the user-curated microguide. The screenshot 1000 further comprises existing tags 1065. Alternatively, or additionally, one or more of the editor and the editorial module reviews and edits the existing microguide category tags 1065 that were previously selected. As depicted, the existing tags 1065 comprise "PHUN," "San Francisco," and "Bay Area."

The screenshot 1000 further comprises a microguide landing page window 1070. The editor can add the microguide to a landing page feature of the website that is configured to direct users from the microguide to a landing page on the website. The microguide landing page window 1070 presents information relating to the landing page. As depicted, the microguide landing page window 1070 comprises a legend, "Merry Go Round" as a description of the image on the website's landing page. The microguide landing page window 1070 further comprises one or more of a landing page status indicator 1072, a landing page title window 1074, a landing page identifying word 1075, and a landing page identifying sub-word 1076. As depicted, the microguide landing page window 1070 further comprises a landing page status indicator 1072, a landing page title window 1074, a landing page identifying word 1075, and a landing page identifying sub-word 1076.

As depicted, the microguide landing status indicator 1072 comprises a legend, "Status." As depicted, the microguide landing page status indicator 1072 further comprises an "active" button and an "inactive" button. As depicted, the "active" button has been selected.

As depicted, the landing page title window 1074 comprises a legend, "Title for front page." As depicted, the editor has written the following landing page title: "Let's get out and have PHUN in San Francisco."

As depicted, the microguide landing page identifying word 1075 comprises a legend, "Identifying word." As depicted, the editor has written the following landing page identifying word: "PHUN."

As depicted, the microguide landing page identifying sub-word 1076 comprises a legend, "Identifying sub-word." As depicted, the editor has written the following landing page identifying sub-word: "San Francisco."

The screenshot 1000 further comprises a book cover tab 1078. The book cover tab 1078 comprises a book cover of one or more of a printed book, an electronic book (ebook), and another type of book. The book cover tab 1078 preferably, but not necessarily, comprises a cover of an ebook comprising the microguide. Preferably, although not necessarily, the ebook is coordinated with the microguide appearing on the website.

As depicted, the book cover tab 1078 comprises a legend, "Select to Upload Cover. Delete Cover." As depicted the book cover tab 1078 further comprises a "Select photo" button allowing one or more of the editor and the curator to select a photograph for the book cover. Preferably, the book cover tab 1078 further comprises an image of the book cover. Preferably, although not necessarily, the book cover tab 1078 further comprises an image of the ebook cover. As depicted, the book cover tab 1078 comprises a book cover 1079. As depicted, the book cover 1079 comprises the ebook corresponding to the user-curated microguide and titled, "Play in San Francisco."

The screenshot 1000 further comprises submissions 1080A, 1080B, and 1080C. One or more of the editor and the editorial module can delete a submission from the microguide. For example, the editor can delete submission 1080A, comprising story 1080A, from the microguide. Alternatively, or additionally, one or more of the editor and the editorial module can change the order of submissions in the microguide. For example, the editor can change the order of submissions 1080B and 1080C, respectively comprising stories 1080B and 1080C.

The screenshot 1000 further comprises a status window selection 1090. One or more of the editor and the editorial module can select one of the status window options 1012 and thereby decline or accept the submitted user-curated microguide. Alternatively, or additionally, the one or more of the editor and the editorial module can delete the submitted user-curated microguide. If the system accepts the submitted microguide, the website publishes the user-curated microguide using the database.

Figure 11:
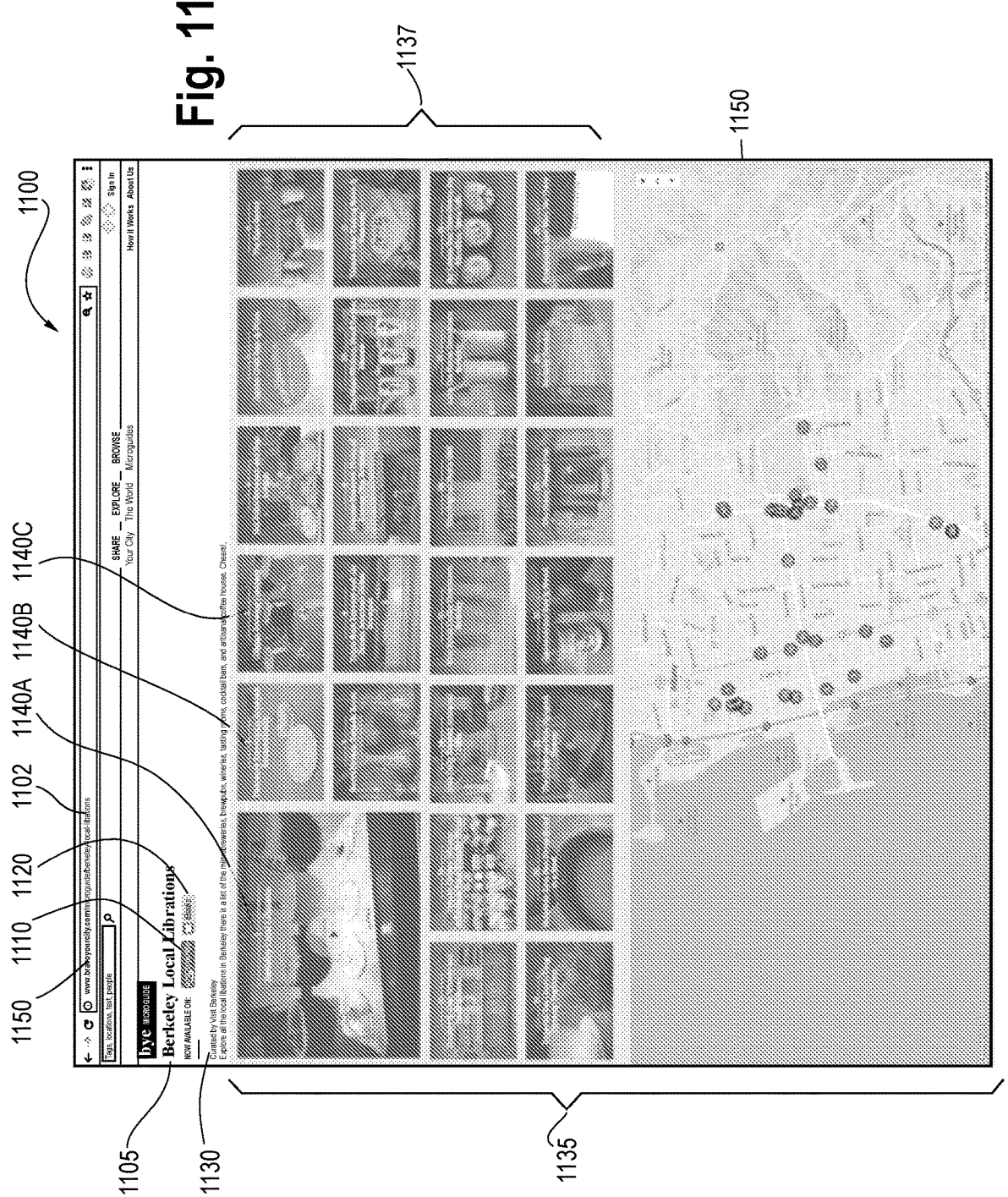
FIG. 11 is an exemplary screenshot of a curation and publication system.

FIG. 11 is an exemplary screenshot 1100 of a curation and publication system. More specifically, FIG. 11 is an exemplary screenshot 1100 of a user-curated microguide published on the website.

The screenshot 1100 comprises a unique Uniform Resource Locator (URL) 1102.

The screenshot 1100 further comprises a microguide title 1105. As depicted, the microguide title 1105 comprises the words, "Berkeley Local Libations."

The screenshot 1100 further comprises a first merchant widget 1110. The first merchant widget 1110 allows the user to easily obtain the user-curated microguide from the first merchant. For example, the first merchant sells the microguide. For example, the first merchant distributes the microguide free of charge.

Alternatively, or additionally, the editor can link the user-curated microguide to any number of publishing platforms and marketplaces of interest. For example, the first merchant comprises Amazon of Seattle, Wash. For example, the first merchant publishes the user-curated microguide on its system with its website logo. For example, one or more of the microguide creation module and a third-party partner submits the user-curated microguide to the first merchant for publication on behalf of the third-party partner.

The screenshot 1100 further comprises a second merchant widget 1120. The second merchant widget 1120 allows the user to easily obtain the user-curated microguide from the second merchant. For example, the second merchant sells the microguide.

For example, the second merchant distributes the microguide free of charge. For example, the second merchant comprises Apple, Inc. of Cupertino, Calif. Alternatively, or additionally, the editor can link the user-curated microguide to any number of publishing platforms and marketplaces of interest. For example, the second merchant publishes the user-curated microguide on its system with its website logo. For example, one or more of the microguide creation module and a third-party partner submits the user-curated microguide to the second merchant for publication on behalf of the third-party partner.

The screenshot further comprises a curator identification window 1130. As depicted, the curator identification window 1130 comprises a legend, "Curated By." The curator identification window 1130 may further comprise a name of a curator of the user-curated microguide. For example the microguide can be curated by any registered user of the system. For example, the curator of the microguide comprises one or more of a creator of content comprised in the microguide, and a user that did not create content comprised in the microguide. When the system assigns a curator to the microguide, the curator identification window 1130 may display the curator's name. Alternatively, or additionally, the curator identification window 1130 may display a biography of the curator.

The screenshot 1100 further comprises a published microguide 1135. As depicted, the published microguide 1135 comprises a published submission tile set 1137. The published submission tile set 1137 comprises published submissions. As depicted, the published submission tile set 1137 comprises twenty-five published submissions 1140A, 1140B, 1140C . . . .

At least one of the published submissions 1140A, 1140B, 1140C . . . comprised in the published submission tile set 1137 functions as a table of contents for the published microguide 1135. Preferably, but not necessarily, each of the published submissions 1140A, 1140B, 1140C . . . comprised in the published submission tile set 1137 functions as a table of contents for the published microguide 1135.

As depicted, the published microguide 1135 further comprises a published interactive map 1150. The published interactive map 1150 comprises a location of at least one published submission 1140A, 1140B, 1140C . . . . For example, the published interactive map 1150 comprises at least one of the published submissions 1140A, 1140B, 1140C . . . as a point of interest (POI). If a user clicks on a POI, the user is directed to a corresponding submission comprised in the published submission tile set 1137.

Preferably, but not necessarily, the printed map comprises locations of each of the published submissions 1140A, 1140B, 1140C . . . comprised in the published microguide 1135. For example, the published interactive map 1150 comprises each of the published submissions 1140A, 1140B, 1140C . . . as points of interest.

Figure 12:
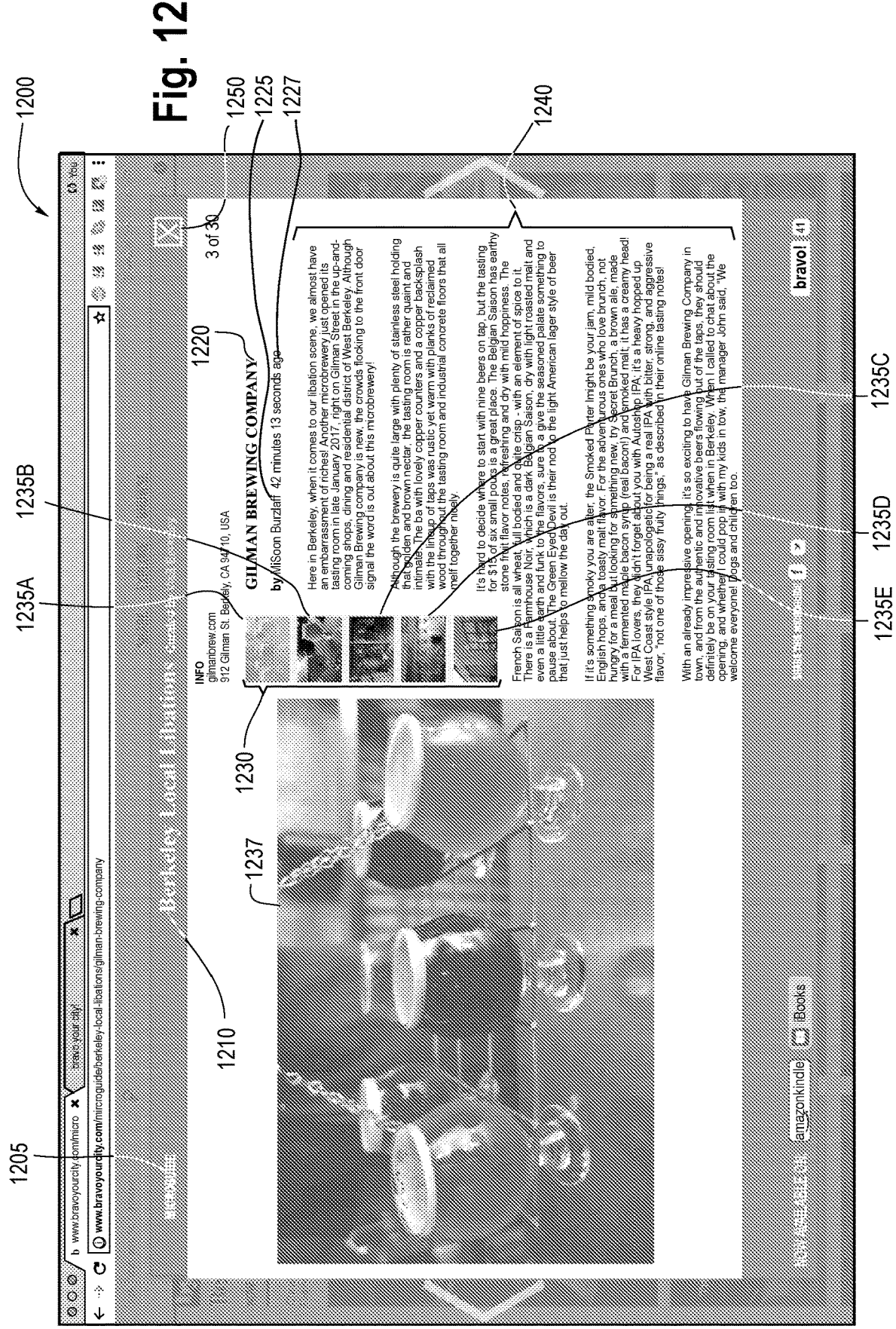
FIG. 12 is an exemplary screenshot of a curation and publication system.

FIG. 12 is an exemplary screenshot 1200 of a curation and publication system. More specifically, FIG. 12 is an exemplary screenshot 1200 of a user-curated microguide page published on the website.

The screenshot 1200 comprises a microguide label 1205. As depicted, the microguide label comprises a legend, "Microguide."

The screenshot 1200 further comprises a microguide title 1210. As depicted, the microguide title 1210 comprises the words, "Berkeley Local Libations." For example, the system displays the microguide title 1210 using a microguide submission viewer (not shown).

The screenshot 1200 further comprises a submission title 1220. In this example, the submission title is, "Gilman Brewing Company." For example, the system displays the submission title 1220 using the microguide submission viewer.

The screenshot 1200 further comprises a submission byline 1225. The submission byline 1225 gives a name of one or more authors of the submission. The byline optionally includes a link to a biographic page relating to the content creator. For example, the system displays the submission byline 1225 using the microguide submission viewer.

The screenshot 1200 further comprises a submission creation time 1227. The submission creation time 1227 gives a time of creation of the submission. For example, the system displays the submission creation time 1227 using the microguide submission viewer.

The screenshot 1200 further comprises a microguide submission panel 1230. The microguide submission panel 1230 comprises one or more microguide submissions 1235A, 1235B, 1235C, 1235D, 1235E. As depicted, the microguide submission panel 1230 comprises the five microguide submission images 1235A, 1235B, 1235C, 1235D, 1235E. For example, the system displays the microguide submission images 1235A, 1235B, 1235C, 1235D, 1235E using the microguide submission viewer.

Using the microguide submission viewer, the system displays one or more of the microguide submission images 1235A, 1235B, 1235C, 1235D, 1235E as a microguide featured submission image 1237. Preferably, although not necessarily, the size of the microguide featured submission image 1237 is larger than the size of the microguide submission images 1235A-1235E. As depicted, the microguide featured submission image 1237 comprises the image shown in the microguide submission image 1235A.

The screenshot 1200 further comprises a submission featured text window 1240 comprising text of the microguide featured submission 1237. Optionally, the screenshot 1200 further comprises submission text windows comprising text of one or more of the microguide submission images 1235A-1235E. The microguide submission viewer comprises a one-click viewer configured for users to read submission text and images side by side without having to click, back-click, click, back-click and so on to read a plurality of microguide submissions 1235A-1235E. Text associated with a selected microguide submission image 1235A-1235E is displayed by the microguide submission viewer alongside the selected microguide submission image 1235A-1235E.

Figure 13:
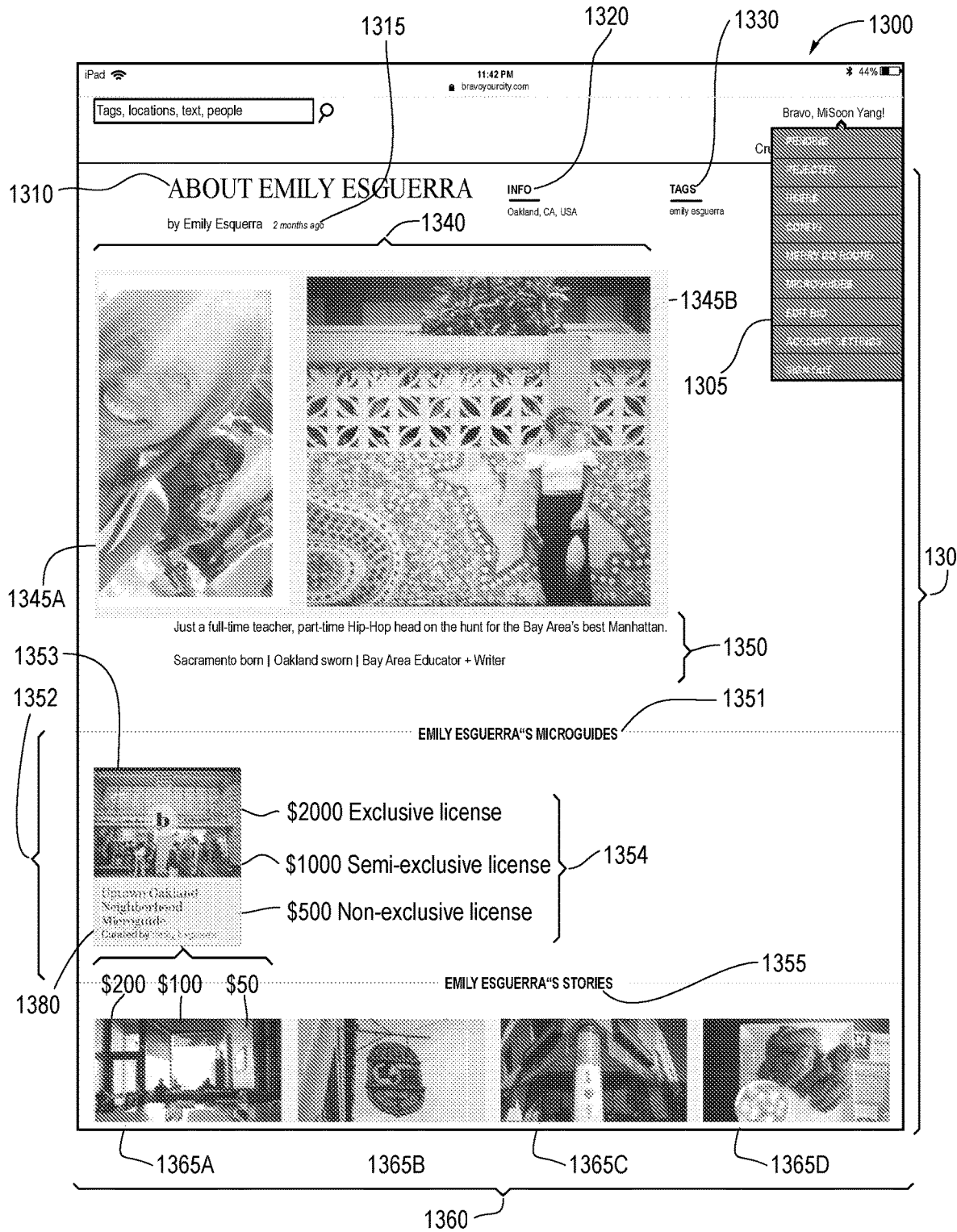
FIG. 13 is an exemplary screenshot of a curation and publication system.

FIG. 13 is an exemplary screenshot 1300 of a curation and publication system. More specifically, FIG. 13 is an exemplary screenshot 1300 comprising a listing 1302 of a content creator's publications.

Preferably, although not necessarily, the listing 1302 comprises one or more of published submissions created by the content creator and microguides curated by the content creator. Preferably, although not necessarily, the listing 1302 comprises both published submissions created by the content creator and microguides created by the content creator. Preferably, although not necessarily, the listing 1302 is published on the website.

The screenshot 1300 further comprises a user options popup menu 1305. A user first completes the login process. When the user hovers a mouse or similar device, the user options popup menu 1305 provides a listing of user options. As depicted, the user options popup menu 1305 comprises options "pending," "rejected," "users," "config," "microguides," "merry-go-round," "edit bio," "account settings," and "sign out." A user who then selects "edit bio" option from the user options popup menu 1305 is presented with a biography creation window (not shown) allowing the user to create their own biography on the website.

The screenshot 1300 further comprises a creator name 1310. As depicted, the creator name legend comprises a legend, "About." As depicted, the creator has added her name, "Emily Esguerra."

The screenshot 1300 further comprises a listing creation time 1315. As depicted, the listing creation time 1315 comprises the words, "2 months ago."

The screenshot 1300 further comprises a content creator location 1320. As depicted, the content creator location comprises a legend, "Info." As depicted, the creator has added her location, "Oakland, Calif., USA."

The screenshot 1300 further comprises a tags window 1330. Using the tags window 1330, the content creator can select one or more category tags for the one or more of published submissions and microguides. The content creator can review the category tags. The content creator can edit the category tags directly. The content creator can use the tags window 1330 to do the tags editing.

The screenshot 1300 further comprises an images pane 1340. The images pane 1340 comprises images 1345A and 1345B selected by the content creator. Typically, although not necessarily, the images 1345A and 1345B comprise content related to one or more of the content creator, a published submission created by the content creator, and a microguide created by the content creator. As depicted, the images 1345A and 1345B both depict the content creator. Using the images pane 1340, the content creator can select the images 1345A and 1345B. The content creator can review the images. The content creator can edit the category tags directly. The content creator can use the tags window 1330 to do the tags editing.

The screenshot 1300 further comprises a text window 1350. The text window 1350 comprises text selected by the content creator. Typically, although not necessarily, the text window 1350 comprises text related to one or more of the content creator, a published submission created by the content creator, and a microguide created by the content creator. As depicted, the text window 1350 comprises the words, "Just a full-time teacher, part-time Hip-Hop head on the hunt for the Bay Area's best Manhattan. Sacramento born. Oakland sworn. Bay Area Educator/Writer." Using the text window 1350, the content creator can review the text. Using the text window 1350, the content creator can edit the text directly.

The screenshot further comprises a microguide label 1351. The microguide label 1351 comprises text describing the microguides. As depicted, the microguide label 1351 comprises the text, "Emily Esguerra's Microguides."

The screenshot further comprises a microguide pane 1352. The microguide pane 1352 comprises a displayed microguide 1353 selected by the content creator. Using the microguide pane 1352, the content creator can select the displayed microguide 1353. The content creator can review the displayed microguide 1353. The content creator can edit the displayed microguide 1353.

The screenshot 1300 further comprises a microguide price listing 1354. The microguide price listing 1354 appears when the user hovers a mouse or similar device over a displayed microguide, in this example, over the displayed microguide 1353. The microguide price listing 1353 comprises pricing for at least one of the content creator's microguides for one or more of licensing and sale to any third party user to license or purchase the rights to the content creator's microguides in the system. For example, the microguide price listing 1354 may offer, as depicted, three different price levels.

A non-exclusive license allows the third party user to purchase a right to use the microguide as one of an unlimited number of licensees. For example, as depicted, the price for a non-exclusive license to use the microguide 1353 is $500. A semi-exclusive license allows the third party user to use the microguide as one of only a limited number of third party licensees. For example, as depicted, the price for an semi-exclusive license to use the microguide 1353 is $1,000. An exclusive license offers the third party user the exclusive right to use the microguide, so that no other third party licensee will have access to it. For example, as depicted, the price for an exclusive license to the microguide 1353 is $2,000.

The screenshot further comprises a submissions label 1355. The submissions label 1355 comprises text describing the submissions. As depicted, the submission label 1355 comprises the text, "Emily Esguerra's Stories."

The screenshot further comprises a submission pane 1360. The submission pane 1360 comprises displayed submissions 1365A, 1365B, 1365C, and 1365D selected by the content creator. Using the submission pane 1360, the content creator can select the displayed submissions 1365A, 1365B, 1365C, and 1365D. The content creator can review the displayed submissions 1365A, 1365B, 1365C, and 1365D. The content creator can edit the displayed submissions 1365A, 1365B, 1365C, and 1365D.

The screenshot 1300 further comprises a submission price listing 1380. The submission price listing 1380 appears when the user hovers a mouse or similar device over a displayed submission, in this example, over the displayed submission 1365A. The submission price listing 1380 comprises pricing for at least one of the content creator's submissions for one or more of licensing and sale to any third party user to license or purchase the rights to the content creator's submissions in the system.

Typically, although not necessarily, for a given type of license, the submission price listing 1380 is less expensive than the microguide price listing 1354. For example, the submission price listing 1380 may offer, as depicted, three different price levels.

A non-exclusive license allows the third party user to purchase a right to use the submission 1365A-1365D as one of an unlimited number of licensees. For example, as depicted, the price for a non-exclusive license to use the first displayed submission 1365A is $50. A semi-exclusive license allows the third party user to use the submission 1365A-1365D as one of only a limited number of third party licensees. For example, as depicted, the price for an semi-exclusive license to use the first displayed submission 1365A is $100. An exclusive license offers the third party user the exclusive right to use the submission 1365A-1365D, so that no other third party licensee will have access to it. For example, as depicted, the price for a limited license to the first displayed submission 1365A is $100. An exclusive license offers the third party user the exclusive right to use the submission 1365A-1365D, so that no other third party user will have access to it. For example, as depicted, the price for an exclusive license to the first displayed submission 1365A is $200.

A registered user can curate a microguide on the system. A registered user can buy licensing rights to the content that can be used by the third party as an individual story or as a third party branded microguide that the system can also publish on a publication interface.

Optionally, the editorial module comprises a payment database configured to track an international payment system. For example, the payment database comprises one or more of a blockchain database and another payment database. For example, the international payment system uses one or more of fiat, cryptocurrency, and another blockchain-based technology. For example, the currency comprises one or more of bitcoin, ethereum, ripple, stellar and another currency. For example, the payment database is configured to pay a user who does one or more of create content and curate content. For example, the payment database is configured to reward a user who does one or more of participate in the publishing system and follow rules set by the system.

If the system sends payment to one or more of a content creator and a content curator, the system is further configured to use the blockchain to track payments to users. For example, the payment database uses one or more of cryptocurrency and blockchain as a money translation intermediary. Optionally, but not necessarily, the system can pay users that create content directly from the system. For example, the system uses the blockchain to maintain a dashboard showing a user the user's earnings from the work they have published on the system. For example, the dashboard shows the user's earnings in one or more of cryptocurrency and fiat value.

The system may create and integrate its own blockchain cryptocurrency. For example, the blockchain cryptocurrency comprises one or more of a blockchain cryptocurrency coin and another blockchain cryptocurrency. For example, the system creates the blockchain cryptocurrency through an Initial Coin Offering (ICO) to create one or more of a payment system for users of the publishing system and a reward system for the users of the publishing system. For example, the system may optionally create one or more of a coin system, a point system, and a reward system configured to do one or more of compensate users and reward users for one or more of content creation, content curation, community editing, and spending time on the system. A user can optionally use the coins for tipping other users in the system. For example, the cryptocurrency coins have no fiat value in the system. For example, the cryptocurrency coins can be sent to one or more of an external wallet and an external application. For example, after being sent to the one or more of an external wallet and an external application, the coins may do one or more of hold value and be tradable outside of the system on a registered money system that complies with applicable government regulations.

Figure 14:
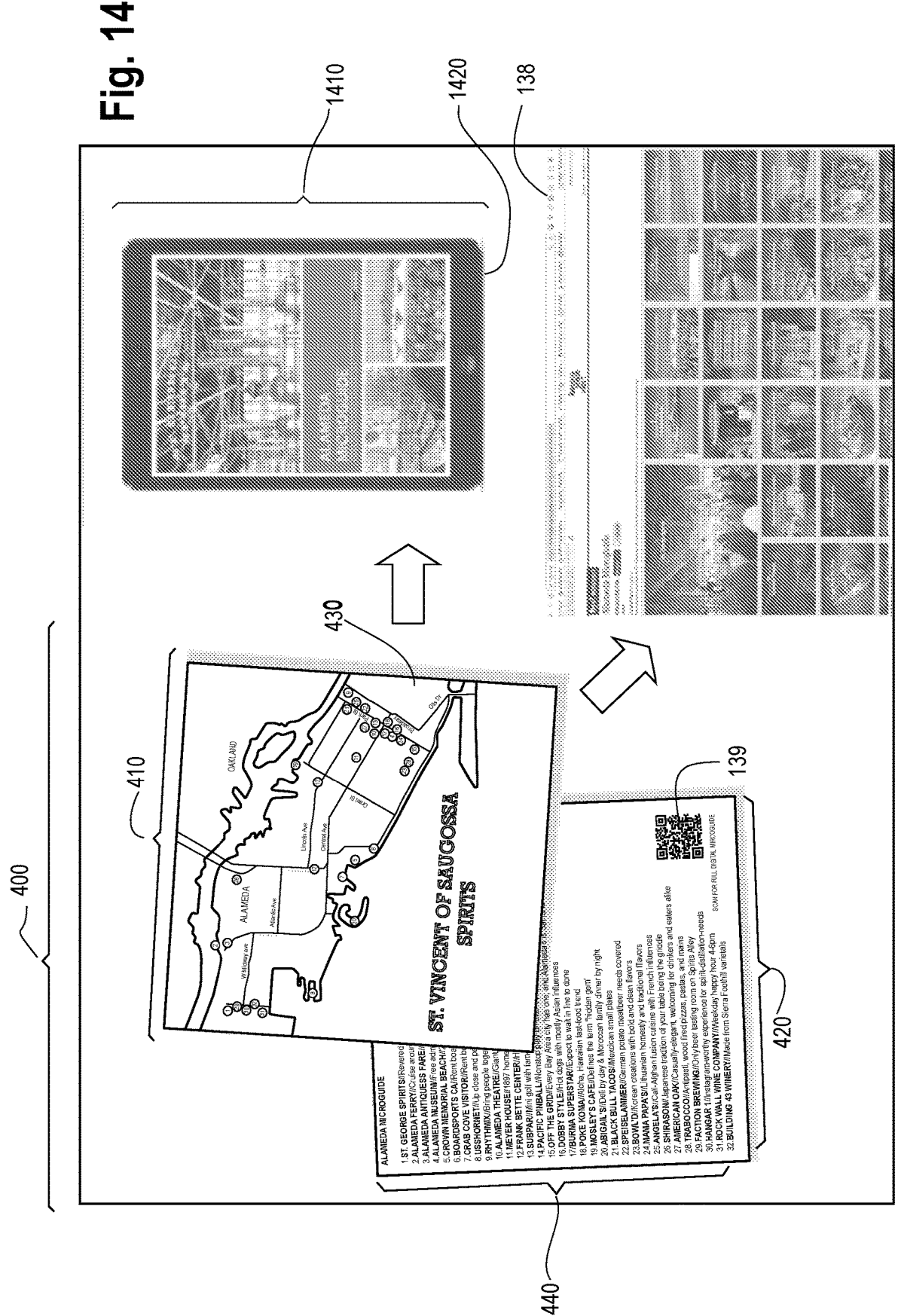
FIG. 14 is a schematic flow diagram showing use of a print microguide created by a curation and publication system.

FIG. 14 is a schematic flow diagram 1400 showing use of a print microguide 400 created by a curation and publication system.

The exemplary print microguide 400 comprises an abridged print microguide of the city of Alameda, Calif. The print microguide 400 may be produced as a print product on one or more of paper, cardboard, and another material. A facsimile of the print microguide 400 may also be displayed on the website. For example, one or more of a system designer and an automated design agent makes the print microguide 400.

Preferably, although not necessarily, the print microguide 400 comprises a first print microguide side 410 and a second print microguide side 420. Included in the print microguide 400 are a street map 430 of the city of Alameda, Calif., a text microguide 440 to the city of Alameda, Calif., and a machine readable code 139. Preferably, although not necessarily, and as depicted, the street map 430 appears on the first print microguide side 410. Preferably, although not necessarily, the text microguide 440 and the machine readable code 139 appear on a second side of the print microguide 400. The machine readable code 139 comprises one or more of a quick response (QR) code, a near-field communication (NFC) chip, and another machine readable code.

As depicted, the machine readable code 139 comprises a QR code 139. As depicted, the street map 430 comprises a one-page map of Alameda. As depicted, the 440 comprises locations of points of interest.

The print microguide 400 is configured to be usable as a print-to-digital product that allows the user, by scanning the QR code 139 using a mobile device, to obtain digital access to an updated, unabridged digital microguide corresponding to a subject of the print microguide 400. For example, the user's mobile device comprises one or more of a mobile telephone, a tablet, a laptop computer, and another mobile device. In this case, the updated, unabridged digital microguide accessible using the QR code 139 comprises a microguide to the city of Alameda, Calif. Scanning the QR code 139 transfers the user to one or more of the website and a third-party website. For example, the third-party website comprises the third-party website of one or more of the creator of the print microguide 400 and a licensee of the creator of the print microguide 400. In this example, the third-party website to which scanning the QR code 139 transfers the user is the third-party website of St. Vincent of Saragossa Spirits, the licensee of the creator of the print microguide 400.

The user scans the QR code 139 using the mobile device. After the user scans the QR code 139 using the mobile device, the system gives the user digital access to the website 1405.

Alternatively, or additionally, after the user scans the QR code 139 using the mobile device, the system gives the user digital access to an updated, unabridged digital microguide 1410 corresponding to a subject of the abridged print microguide 400. As depicted, the system displays the digital microguide 1410 on the user's tablet 1420. The digital microguide 1410 can display one or more of a machine readable microguide, an electronic book, a PDF document, an iFrame overlay, an app, a news platform publication, the website, and another publication. As depicted, the digital microguide 1410 displays the website.

Alternatively, or additionally, after the user scans the QR code 139 using the mobile device, the system gives the user access to one or more of a podcast, an audio file, a video file, an image, text, and another user accessible media.

Alternatively, or additionally, the print microguide 400 comprises a magazine. For example, the print microguide 400 comprises a foldable magazine. For example, the foldable magazine comprises one or more of a publishing theme, a guide to a city, a guide to a neighborhood of a city, content relating to lifestyle, and other magazine content. For example, the publishing theme is selected by one or more of the user and a curator.

For example, the print microguide 400 comprises one or more of a travel guide, a lifestyle guide, and another guide. For example, the print microguide 400 comprises evergreen content. For example, the evergreen content comprises content that lives a long time without changes and stays current as is, such as, for example, landmarks. By contrast, for example, although not necessarily, the print microguide 400 does not comprise non-evergreen content such as, for example, one or more of museum hours, restaurant hours and restaurant prices.

For example, a third-party user can integrate a design of the print microguide 400 into the third-party user's printed product. For example, a third-party user airline magazine could create a digital guide that would be linked from a linking page to the unabridged guide. For example, the linking page comprises a page designed by one or more of the third-party user and the microguide creation module.

Figure 15:
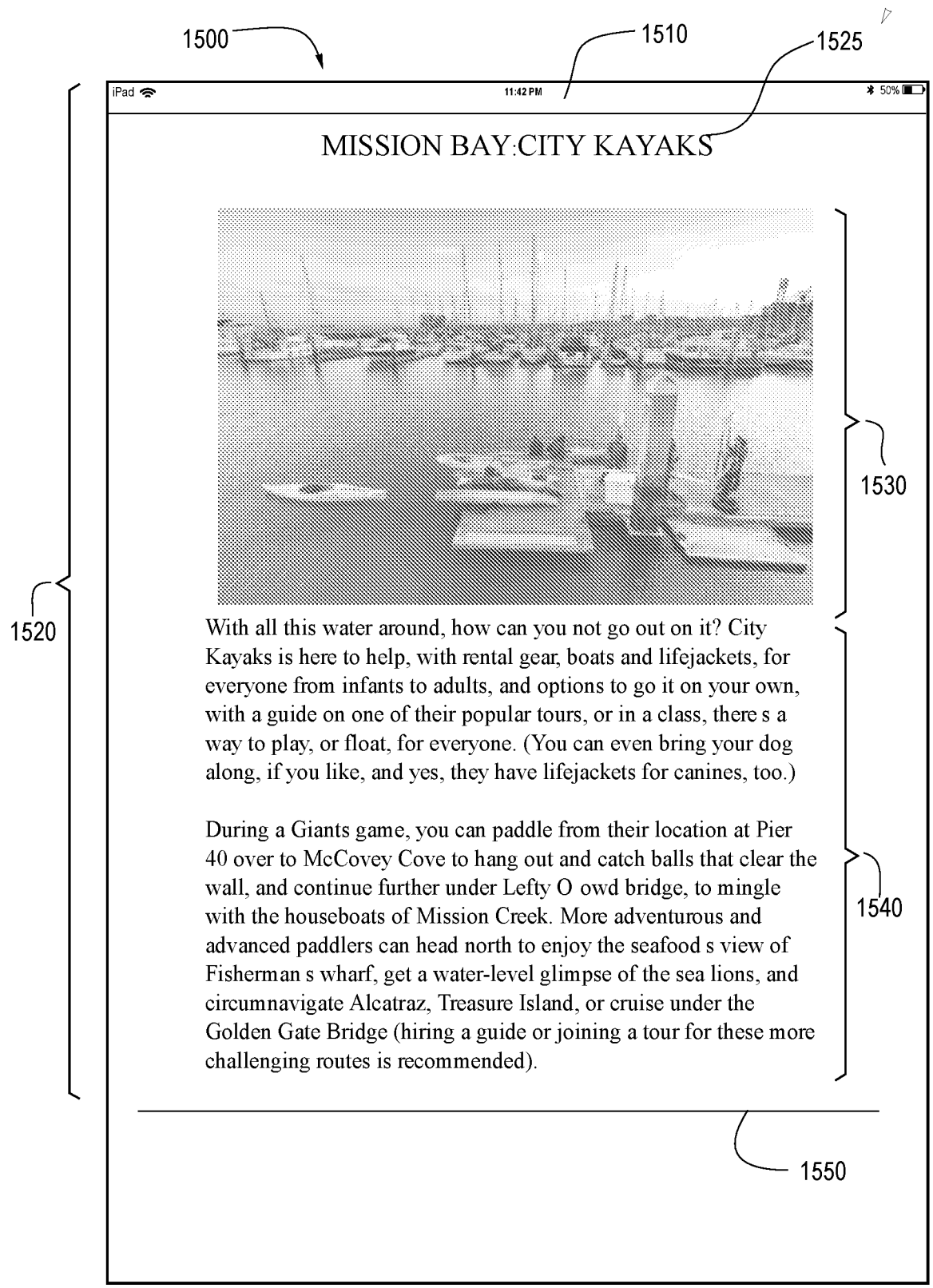
FIG. 15 is an exemplary screenshot of a curation and publication system.

FIG. 15 is an exemplary screenshot of a curation and publication system. More specifically, FIG. 15 is an exemplary screenshot of a Portable Digital Format (PDF) microguide 1500 produced in PDF format by the curation and publication system.

A registered user can create the PDF microguide 1500. The registered user comprises one or more of the content creator, the microguide curator, and another registered user. The user can access the PDF microguide 1500 via one or more of a download, email, and another access modality.

The PDF microguide 1500 comprises a PDF microguide title 1510. As depicted, the PDF microguide title 1510 comprises the words, "Play in San Francisco PDF."

The PDF microguide 1500 further comprises an accepted PDF submission 1520. As depicted, the accepted PDF submission 1520 comprises a PDF submission title 1525. As depicted, the PDF submission title 1525 comprises the words, "Mission Bay City Kayaks." The accepted PDF submission 1520 further comprises a PDF submission image 1530. The accepted PDF submission further comprises submission text 1540.

The PDF microguide 1500 further comprises an automatically generated page break 1550. The page break 1550 provides professional PDF formatting.

Figure 16:
FIG. 16 is an exemplary screenshot of a curation and publication system.

FIG. 16 is an exemplary screenshot of a curation and publication system. More specifically, FIG. 16 is an exemplary screenshot of an electronic book (ebook) production user interface 1600 allowing a user to create an ebook using the curation and publication system. For example, the user interface discussed above comprises the ebook production user interface 1600.

A registered user can create the ebook using the ebook production user interface 1600. The registered user comprises one or more of the content creator, the microguide curator, and another registered user.

The ebook production interface 1600 comprises an ebook production interface title 1610. As depicted, the ebook production interface title 1610 comprises the words, "Configure EPub."

The ebook production interface 1600 further comprises an ebook title 1620. As depicted, the ebook title 1620 comprises the words, "Play in Korea."

The ebook production interface 1600 further comprises a cover button 1630. Using the cover button 1630, the user can select one or more images for the cover of the ebook. Alternatively, or additionally, the user can select one or more of a logo, and date, a title, and another cover item for the cover of the ebook.

The ebook production interface 1600 further comprises an ebook cover preview pane 1640. The ebook cover preview pane 1640 is configured to display a preview of the ebook cover. The user can review the ebook cover using the ebook cover preview pane 1640 and can do one or more of edit the cover, delete the cover, and approve the cover for publication.

The ebook production interface 1600 further comprises an image size button 1650. Optionally, the system does provide a default size for images. Using the image size button 1650, the user can accept the default size or select a preferred size. For example, the user may select a smaller size to create a smaller image file. Alternatively, or additionally, the user may select a larger size so the image has a higher resolution.

The ebook production interface 1600 further includes an author byline window 1660. Using the author byline window 1660, the user can input a name of an author of the ebook.

The ebook production interface 1600 further includes an author biography window 1670. Using the author biography window 1660, the user can input a biography of an author of the ebook.

The ebook production interface 1600 further includes an ebook export button 1680. The user can preview the ebook as the user creates it using the system's ebook production interface 1600. When the user is satisfied with the ebook, the user clicks the ebook export button 1680. The system then exports the ebook. For example, the system exports the book by one or more of a download, an email message, and another exportation modality.

Figure 17:
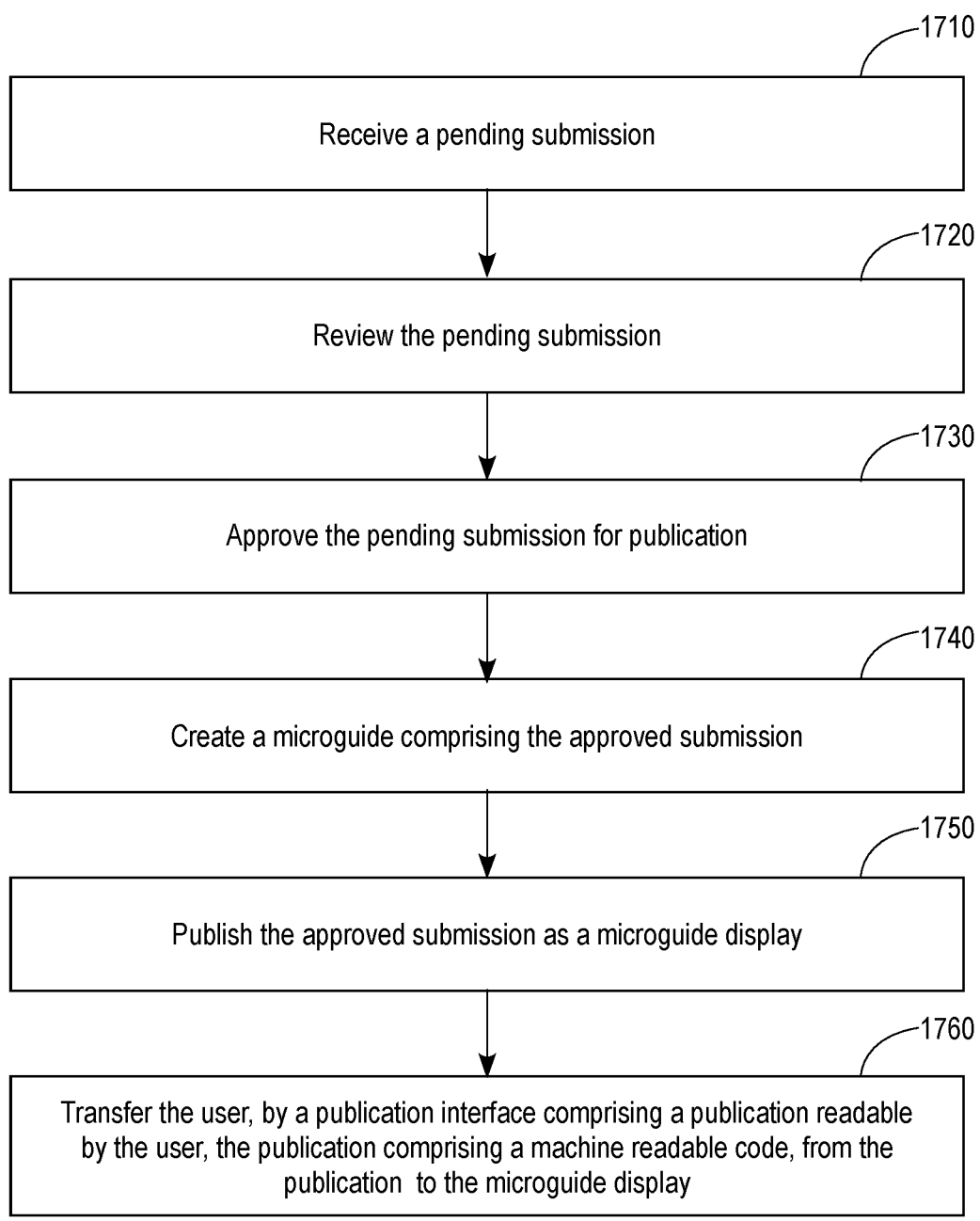
FIG. 17 is a flow chart of a method for curating and publishing user-generated content.

The order of the steps in the method 1700 is not constrained to that shown in FIG. 17 or described in the following discussion. Several of the steps could occur in a different order without affecting the final result.

In step 1710, the pending submission is received. For example, an editorial module operably connected to the website receives the pending submission. For example, the editorial module receives the pending submission from a creating user. For example, the editorial module receives the pending submission from a submission inventory. Block 1710 then transfers control to block 1720.

In step 1720, the pending submission is reviewed. For example, an editorial module operably connected to a website, the website operably connected to a database, reviews the pending submission. Block 1720 then transfers control to block 1730.

In step 1730, the pending submission is approved for publication. For example, an editorial module approves the pending submission for publication. Block 1730 then transfers control to block 1740.

In step 1740, a microguide is created comprising the approved submission. For example, a microguide creation module operably connected to the database creates the microguide. Block 1740 then transfers control to block 1750.

In step 1750, the microguide is published as a microguide display. For example, the website publishes the microguide. Block 1750 transfers control to block 1760.

In step 1760, a publication interface comprising a publication readable by a user, transfers the user from the publication to the microguide display. Block 1760 then terminates the process.

Advantages of the invention include providing a microguide submission viewer comprising a one-click viewer configured for users to read submission text and images side by side without having to click, back-click, click, back-click and so on to read a plurality of microguide submissions. Another advantage is the opportunity for the user to link from an abridged print microguide to the unabridged electronic microguide on the website. This feature enables continual maintenance of electronic microguides in updated form. This feature enables listing of current events in one or more of a city and a neighborhood.

Further advantages of the invention include allowing a third party user to add the system's microguide to one or more of the third party user's website and the third party user's system. Thus a digital publishing modality is provided enabling text and images to be embedded in one or more of a third party website and a third party system. For example, one or more of a style of the website and a branding of the website can be removed. Accordingly, the third party user then displays, on the one or more of a third party website and a third party system, just the microguide itself without any other content from the website.

A still further advantage of the invention is that a curated submission collection can itself be treated as a single curated submission and submitted by a user to the editorial module for consideration for publication on the website.

For example, it will be understood by those skilled in the art that software used by the method and curation and publication system may be located in any location in which it may be accessed by the system. It will be further understood by those of skill in the art that the number of variations of the network, location of the software, and the like are virtually limitless. It is intended, therefore, that the subject matter in the above description shall be interpreted as illustrative and shall not be interpreted in a limiting sense.

For example, embodiments of the invention could operate on a wide range of mobile devices other than mobile phones, tablets, and computers without substantially affecting the functioning of embodiments of the invention.

While the above representative embodiments have been described with certain components in exemplary configurations, it will be understood by one of ordinary skill in the art that other representative embodiments can be implemented using different configurations and/or different components.

For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A method for curating and publishing, comprising:
   receiving a pending submission from a content creator;
   reviewing the pending submission;
   approving the pending submission for publication;
   paying the content creator using an international payment system, wherein the international payment system comprises a blockchain;
   using the blockchain to maintain a dashboard showing a user the user's earnings from work the user has published on the system;
   creating a microguide comprising the approved submission;
   publishing the microguide as a microguide display; and
   transferring a user, by a publication interface comprising a publication readable by the user, the publication comprising a machine readable code, from the publication to the microguide display, wherein the publication comprises an abridged print microguide, wherein the print microguide is produced as a print product on one or more of paper and cardboard, wherein the print microguide comprises a first print microguide side and a second print microguide side, wherein the first print microguide side comprises a street map, wherein the second print microguide side comprises text microguide, wherein the second print microguide side further comprises a machine readable code usable as a print-to-digital product that allows the user, by scanning the machine readable code using a mobile device, to obtain digital access to an updated, unabridged digital microguide corresponding to a subject of the print microguide, wherein the machine readable code comprises a quick response (QR) code, wherein after the user scans the QR code using the mobile device, the system gives the user digital access to the website.

2. The method of claim 1, wherein the paying step comprises a sub-step of: creating a blockchain cryptocurrency.

3. The method of claim 2, wherein the blockchain cryptocurrency comprises a blockchain cryptocurrency coin.

4. The method of claim 2, wherein the sub-step of creating the blockchain cryptocurrency comprises a sub-sub step of: making an initial coin offering.

5. The method of claim 4, wherein the making sub-sub-step creates one or more of a payment system for users and a reward system for users.

\* \* \* \* \*